(12) United States Patent
Stettes et al.

(10) Patent No.: US 12,465,175 B2
(45) Date of Patent: Nov. 11, 2025

(54) PAN STORAGE APPARATUS

(71) Applicant: Duke Manufacturing Co., St. Louis, MO (US)

(72) Inventors: Gregory G. Stettes, Pacific, MO (US); Douglas Michael Lewis, St. Charles, MO (US); Alan B. Mosely, Jr., Belleville, IL (US)

(73) Assignee: DUKE MANUFACTURING CO., St. Louis, MO (US)

( * ) Notice: Subject to any disclaimer, the term of this patent is extended or adjusted under 35 U.S.C. 154(b) by 945 days.

(21) Appl. No.: 17/584,777

(22) Filed: Jan. 26, 2022

(65) Prior Publication Data
US 2022/0233023 A1 Jul. 28, 2022

Related U.S. Application Data

(60) Provisional application No. 63/141,510, filed on Jan. 26, 2021.

(51) Int. Cl.
*A47J 39/00* (2006.01)
(52) U.S. Cl.
CPC .................................. *A47J 39/006* (2013.01)
(58) Field of Classification Search
CPC ..................................................... A47J 39/006
USPC ............................................................ 99/483
See application file for complete search history.

(56) References Cited

U.S. PATENT DOCUMENTS

| 309,192 | A | * | 12/1884 | Brothers | A47B 55/00 |
|---|---|---|---|---|---|
| | | | | | 312/301 |
| 740,677 | A | * | 10/1903 | Monsen et al. | A47B 88/90 |
| | | | | | 312/273 |
| 803,102 | A | * | 10/1905 | Harris | A47B 31/00 |
| | | | | | 211/126.15 |
| 1,496,099 | A | * | 6/1924 | O'Connor | E05B 63/0065 |
| | | | | | 312/334.44 |
| 1,627,541 | A | | 5/1927 | Katzinger | |
| 1,820,070 | A | | 8/1931 | Hippee | |
| 2,076,091 | A | | 4/1937 | O'Neill | |
| 2,257,468 | A | | 9/1941 | Langel | |

(Continued)

FOREIGN PATENT DOCUMENTS

| CA | 700459 A | 12/1964 |
|---|---|---|
| EP | 2666396 A2 | 11/2013 |

(Continued)

OTHER PUBLICATIONS

Brothers, U.S. Pat. No. 309,192 patented Dec. 16, 1884, 3 pages.

(Continued)

*Primary Examiner* — Jimmy Chou
(74) *Attorney, Agent, or Firm* — Stinson LLP

(57) ABSTRACT

Pan storage apparatus, components thereof, and associated methods. A pan storage apparatus can include a housing including a pan support surface for supporting a pan. The pan storage apparatus can include cover support structure for supporting a cover to cover an open top of the pan when the pan is supported by the pan support surface. A variety of covers can be used, and/or the covers can be rearranged to accommodate holding different types, sizes, and/or arrangements of pans. Desirably, the covers are retained in the housing when the pans are inserted into or removed from the housing.

28 Claims, 24 Drawing Sheets

(56) References Cited

U.S. PATENT DOCUMENTS

| | | | | |
|---|---|---|---|---|
| 2,415,825 A * | 2/1947 | Knuth | A47B 57/20 | |
| | | | 211/183 | |
| 2,517,725 A | 8/1950 | Schweller | | |
| 2,763,526 A * | 9/1956 | Falek | A47B 88/906 | |
| | | | 312/270.3 | |
| 2,779,497 A | 1/1957 | Kollman et al. | | |
| 2,813,653 A * | 11/1957 | Grossman | B65D 43/12 | |
| | | | 220/345.2 | |
| 2,816,809 A * | 12/1957 | Miller | B60N 3/08 | |
| | | | 312/270.1 | |
| 2,964,609 A | 12/1960 | Anoff | | |
| 3,051,582 A | 8/1962 | Muckler et al. | | |
| 3,073,938 A * | 1/1963 | Turner | H05B 1/0213 | |
| | | | 337/87 | |
| 3,266,858 A * | 8/1966 | Klotz | F25D 25/021 | |
| | | | 312/301 | |
| 3,295,904 A * | 1/1967 | Cobb | F25D 25/025 | |
| | | | 312/270.3 | |
| 3,313,917 A | 4/1967 | Ditzler et al. | | |
| 3,353,885 A | 11/1967 | Hanson | | |
| 3,353,886 A | 11/1967 | Tompkins | | |
| 3,528,718 A * | 9/1970 | Braun | B65F 1/06 | |
| | | | 312/270.3 | |
| 3,597,238 A | 8/1971 | Scharre | | |
| 3,601,582 A | 8/1971 | Boisfleury | | |
| 3,608,627 A * | 9/1971 | Shevlin | A47J 39/006 | |
| | | | 165/206 | |
| 3,655,063 A * | 4/1972 | Landry | A47F 5/0025 | |
| | | | 211/126.15 | |
| 3,681,568 A | 8/1972 | Schaefer | | |
| 3,751,629 A * | 8/1973 | Eisler | F24C 7/00 | |
| | | | 426/243 | |
| 3,752,640 A | 8/1973 | Schneider | | |
| 3,804,330 A * | 4/1974 | Miller, Jr. | A01M 1/2055 | |
| | | | 239/34 | |
| 3,866,993 A * | 2/1975 | Dean | E05B 65/463 | |
| | | | 312/216 | |
| 3,868,123 A * | 2/1975 | Berg | B62B 3/005 | |
| | | | 312/249.11 | |
| 3,870,387 A | 3/1975 | Mortashed | | |
| 3,874,552 A | 4/1975 | Grimm | | |
| 3,908,749 A * | 9/1975 | Williams | A47J 39/006 | |
| | | | 219/403 | |
| 4,024,377 A | 5/1977 | Henke | | |
| 4,048,473 A * | 9/1977 | Burkhart | A47J 27/004 | |
| | | | 219/521 | |
| 4,099,512 A | 7/1978 | Noonan | | |
| 4,110,587 A | 8/1978 | Souder, Jr. et al. | | |
| 4,149,518 A | 4/1979 | Schmidt et al. | | |
| 4,198,559 A | 4/1980 | Walter et al. | | |
| 4,235,282 A * | 11/1980 | de Filippis | A47J 39/006 | |
| | | | 219/400 | |
| 4,349,147 A * | 9/1982 | Jensen | B65D 5/003 | |
| | | | 206/509 | |
| 4,760,921 A * | 8/1988 | Licari | A47B 87/0269 | |
| | | | 206/505 | |
| 4,771,907 A | 9/1988 | Torney | | |
| 4,784,054 A | 11/1988 | Karos et al. | | |
| D308,497 S | 6/1990 | Roche | | |
| 4,967,995 A | 11/1990 | Burgess | | |
| D320,327 S | 10/1991 | Hollins | | |
| 5,086,693 A * | 2/1992 | Tippmann | F25D 25/028 | |
| | | | 99/468 | |
| D326,795 S | 6/1992 | Reitz | | |
| 5,188,020 A | 2/1993 | Buchnag | | |
| 5,235,903 A | 8/1993 | Tippmann | | |
| 5,251,975 A | 10/1993 | Braun et al. | | |
| 5,253,564 A * | 10/1993 | Rosenbrock | A21B 1/48 | |
| | | | 99/335 | |
| 5,285,051 A * | 2/1994 | DeGrow | A23B 2/82 | |
| | | | 219/386 | |
| D347,360 S | 5/1994 | Wheeler | | |
| 5,365,038 A | 11/1994 | Mitsugu | | |
| 5,403,997 A * | 4/1995 | Wimpee | H05B 3/746 | |
| | | | 219/386 | |
| 5,441,344 A * | 8/1995 | Cook, III | G01K 1/14 | |
| | | | 374/E7.016 | |
| 5,454,427 A * | 10/1995 | Westbrooks, Jr. | A47B 31/02 | |
| | | | 99/332 | |
| D364,530 S * | 11/1995 | Robards, Jr | D7/350.4 | |
| 5,470,143 A | 11/1995 | Gill | | |
| 5,496,987 A | 3/1996 | Siccardi et al. | | |
| 5,542,206 A * | 8/1996 | Lisch | A01K 97/06 | |
| | | | 220/4.27 | |
| 5,579,952 A * | 12/1996 | Fiedler | G07F 9/105 | |
| | | | 219/521 | |
| 5,607,213 A | 3/1997 | Slivon et al. | | |
| 5,653,905 A | 8/1997 | McKinney | | |
| 5,671,856 A * | 9/1997 | Lisch | B65D 21/0228 | |
| | | | 220/4.27 | |
| 5,699,925 A * | 12/1997 | Petruzzi | B65D 21/0204 | |
| | | | 206/508 | |
| 5,713,414 A * | 2/1998 | Ko | A23B 7/045 | |
| | | | 165/185 | |
| 5,724,886 A * | 3/1998 | Ewald | A47B 88/43 | |
| | | | 99/468 | |
| 5,746,114 A * | 5/1998 | Harris | A47J 36/321 | |
| | | | 219/448.12 | |
| 5,771,959 A * | 6/1998 | Westbrooks, Jr. | A23B 2/82 | |
| | | | 219/386 | |
| 5,783,803 A * | 7/1998 | Robards, Jr. | A47J 39/00 | |
| | | | 219/385 | |
| 5,806,333 A * | 9/1998 | Kim | F25D 23/065 | |
| | | | 211/126.15 | |
| 5,828,547 A * | 10/1998 | Francovich | G11B 33/128 | |
| 5,852,967 A * | 12/1998 | Fortmann | F24C 7/00 | |
| | | | 99/476 | |
| 5,900,173 A * | 5/1999 | Robards, Jr. | A47J 39/00 | |
| | | | 219/214 | |
| 5,947,012 A | 9/1999 | Ewald et al. | | |
| 6,011,243 A | 1/2000 | Arnold et al. | | |
| 6,028,297 A * | 2/2000 | Hamada | A47J 27/04 | |
| | | | 219/625 | |
| 6,031,208 A | 2/2000 | Witt et al. | | |
| 6,034,355 A * | 3/2000 | Naderi | A47J 39/006 | |
| | | | 219/386 | |
| 6,073,547 A * | 6/2000 | Westbrooks, Jr. | A47J 39/003 | |
| | | | 312/410 | |
| 6,098,529 A * | 8/2000 | Brummett | A47F 7/0071 | |
| | | | 219/214 | |
| 6,116,154 A * | 9/2000 | Vaseloff | A47J 39/02 | |
| | | | 219/400 | |
| 6,119,587 A | 9/2000 | Ewald et al. | | |
| 6,175,099 B1 * | 1/2001 | Shei | A47J 39/006 | |
| | | | 219/385 | |
| 6,198,084 B1 * | 3/2001 | Kim | H05B 6/6455 | |
| | | | 219/703 | |
| 6,209,447 B1 | 4/2001 | Ewald et al. | | |
| 6,262,394 B1 * | 7/2001 | Shei | A47J 39/006 | |
| | | | 219/385 | |
| 6,344,630 B1 * | 2/2002 | Jarvis | A47J 39/006 | |
| | | | 219/400 | |
| 6,358,548 B1 | 3/2002 | Ewald et al. | | |
| 6,412,403 B1 * | 7/2002 | Veltrop | A47J 39/02 | |
| | | | 219/400 | |
| 6,444,965 B1 * | 9/2002 | Ha | H05B 6/6435 | |
| | | | 700/211 | |
| D468,102 S * | 1/2003 | Taylor | D3/304 | |
| 6,539,846 B2 | 4/2003 | Citterio et al. | | |
| 6,541,739 B2 | 4/2003 | Shei et al. | | |
| 6,558,994 B2 * | 5/2003 | Cha | H01L 21/76264 | |
| | | | 438/164 | |
| 6,587,739 B1 * | 7/2003 | Abrams | G05B 15/02 | |
| | | | 7/110 | |
| 6,637,322 B2 * | 10/2003 | Veltrop | A47J 36/2483 | |
| | | | 219/400 | |
| 6,657,167 B2 | 12/2003 | Loveless | | |
| 6,658,994 B1 * | 12/2003 | McMillan | A23B 2/708 | |
| | | | 219/214 | |

(56) References Cited

U.S. PATENT DOCUMENTS

| | | | |
|---|---|---|---|
| 6,774,347 B2 * | 8/2004 | Shon | H05B 6/642 219/757 |
| 6,871,676 B2 * | 3/2005 | Sus | B65B 43/305 141/168 |
| 6,874,828 B2 * | 4/2005 | Roatis | G07F 9/10 292/201 |
| 6,878,391 B2 | 4/2005 | Veltrop | |
| 6,884,451 B2 | 4/2005 | Veltrop | |
| 6,924,467 B2 * | 8/2005 | Ellis | A61F 7/007 219/217 |
| 7,043,969 B2 * | 5/2006 | Matsiev | G01N 11/16 73/54.41 |
| 7,075,442 B2 * | 7/2006 | Lion | G01K 1/024 374/E1.004 |
| D526,157 S | 8/2006 | Laib et al. | |
| 7,105,779 B2 * | 9/2006 | Shei | F24C 7/087 219/394 |
| D538,588 S | 3/2007 | Laib et al. | |
| 7,227,102 B2 * | 6/2007 | Shei | A47J 39/006 219/394 |
| 7,328,654 B2 * | 2/2008 | Shei | A47J 39/006 219/486 |
| RE40,290 E * | 5/2008 | Shei | A47J 39/006 219/385 |
| 7,385,160 B2 * | 6/2008 | Jones | F24C 15/16 126/339 |
| 7,407,392 B1 * | 8/2008 | Cooke | H02G 3/185 108/62 |
| 7,409,765 B2 * | 8/2008 | So | A47J 45/068 374/155 |
| D581,205 S | 11/2008 | Simon et al. | |
| 7,446,282 B2 * | 11/2008 | Shei | F24C 7/087 219/400 |
| D584,612 S | 1/2009 | Ianello | |
| D586,623 S | 2/2009 | Dunn | |
| 7,488,919 B2 * | 2/2009 | Gagas | F24C 15/18 219/400 |
| 7,501,608 B2 * | 3/2009 | Hallgren | H05B 6/6455 374/149 |
| 7,510,096 B2 * | 3/2009 | Wang | B65D 21/083 206/508 |
| 7,661,553 B2 | 2/2010 | Zeiron | |
| 7,687,748 B2 * | 3/2010 | Gagas | F24C 15/2042 219/623 |
| D613,113 S | 4/2010 | Lippert et al. | |
| D619,829 S | 7/2010 | Zalewski et al. | |
| 7,762,636 B2 * | 7/2010 | Veeser | A47B 88/407 312/246 |
| D620,765 S | 8/2010 | Sudia | |
| D620,766 S | 8/2010 | Sudia | |
| D620,942 S | 8/2010 | Huang | |
| 7,765,918 B2 * | 8/2010 | Garniss | A47J 37/044 99/330 |
| 7,858,906 B2 * | 12/2010 | Veltrop | A47J 39/006 219/385 |
| 7,901,723 B2 * | 3/2011 | Calzada | B65D 1/34 220/23.88 |
| 7,905,173 B2 * | 3/2011 | Sus | F24C 15/166 219/214 |
| 7,933,733 B2 * | 4/2011 | Ashrafzadeh | G01F 23/2928 702/116 |
| 7,971,523 B2 * | 7/2011 | Hartfelder | A47J 39/006 426/418 |
| 8,061,266 B2 * | 11/2011 | Wisner | A47J 39/006 219/214 |
| 8,076,616 B2 | 12/2011 | Stanger | |
| 8,087,407 B2 * | 1/2012 | Wiker | A21B 1/40 99/336 |
| 8,091,472 B2 * | 1/2012 | Maciejewski | A47J 39/00 219/385 |
| 8,096,231 B2 * | 1/2012 | Veltrop | A47J 39/006 219/385 |
| 8,172,107 B2 * | 5/2012 | Hoffman | A47J 37/108 99/422 |
| 8,188,409 B2 * | 5/2012 | Baier | G01K 13/00 219/709 |
| D664,149 S | 7/2012 | Crisp et al. | |
| 8,404,292 B2 * | 3/2013 | Veltrop | A47J 39/006 219/385 |
| 8,522,675 B2 * | 9/2013 | Veltrop | A23L 5/15 219/214 |
| 8,567,661 B2 * | 10/2013 | Sullivan | B65D 5/0035 229/120.31 |
| 8,607,587 B2 * | 12/2013 | Veltrop | F25D 25/028 62/252 |
| 8,695,489 B2 * | 4/2014 | Ewald | A47J 39/006 99/468 |
| D704,511 S * | 5/2014 | Beckman | D7/552.2 |
| 8,810,417 B2 * | 8/2014 | Hood | A61B 5/00 73/426 |
| 8,813,960 B2 * | 8/2014 | Fjelland | B65D 21/023 220/4.27 |
| D716,095 S * | 10/2014 | Veltrop | D7/323 |
| 8,864,250 B2 * | 10/2014 | Anderson | F25D 25/025 312/330.1 |
| D718,086 S | 11/2014 | Lewis et al. | |
| 8,887,943 B1 * | 11/2014 | Miller | A47G 19/02 220/573.1 |
| D719,956 S | 12/2014 | Akana et al. | |
| D725,429 S * | 3/2015 | Veltrop | D7/323 |
| 8,985,018 B2 * | 3/2015 | Patterson | B65D 21/0217 220/4.27 |
| 8,997,636 B2 * | 4/2015 | Kirby | F24C 7/082 99/468 |
| D728,991 S | 5/2015 | Hasegawa | |
| 9,024,766 B2 * | 5/2015 | Hood | G01N 33/14 73/426 |
| 9,068,768 B2 * | 6/2015 | Veltrop | F25D 25/024 |
| 9,112,298 B1 * | 8/2015 | Hayden | H02G 3/14 |
| 9,140,484 B2 * | 9/2015 | Veltrop | F25B 21/02 |
| 9,187,210 B2 * | 11/2015 | Zhu | E05C 19/14 |
| D749,894 S * | 2/2016 | Bigott | D7/391 |
| 9,290,293 B2 * | 3/2016 | Tilton | A47F 5/08 |
| 9,469,024 B2 * | 10/2016 | Bensman | B65D 25/28 |
| 9,504,318 B1 * | 11/2016 | O'Keefe | H02G 3/18 |
| 9,693,655 B2 * | 7/2017 | Shei | A47J 37/0623 |
| 9,756,936 B1 * | 9/2017 | Raghavan | A47B 31/00 |
| 9,788,652 B2 * | 10/2017 | Greer | A47B 75/00 |
| 9,844,301 B2 | 12/2017 | Shields et al. | |
| 9,854,943 B2 * | 1/2018 | Betzold | A47J 39/02 |
| D809,326 S * | 2/2018 | Kestner | D7/323 |
| 9,901,212 B2 * | 2/2018 | Stanger | A47J 39/006 |
| 9,901,213 B2 * | 2/2018 | Veltrop | A47J 39/02 |
| D812,417 S * | 3/2018 | Bigott | D7/391 |
| 9,962,038 B2 * | 5/2018 | Veltrop | G05B 15/02 |
| 9,976,750 B1 * | 5/2018 | Kestner | A47J 36/2488 |
| 9,980,322 B1 * | 5/2018 | Kestner | H05B 3/0076 |
| 10,117,513 B1 * | 11/2018 | Tolentino | A47B 31/04 |
| 10,136,762 B2 * | 11/2018 | Laub | G06F 12/0646 |
| 10,154,757 B2 * | 12/2018 | Veltrop | A47J 39/006 |
| 10,213,052 B2 * | 2/2019 | Veltrop | G05B 15/02 |
| 10,258,197 B1 * | 4/2019 | Fortmann | A47J 39/006 |
| 10,271,689 B2 * | 4/2019 | Veltrop | A47J 39/006 |
| 10,271,690 B2 * | 4/2019 | Veltrop | A47J 39/02 |
| 10,349,777 B2 * | 7/2019 | Kothari | A47J 39/006 |
| 10,455,983 B2 * | 10/2019 | Veltrop | A47J 39/006 |
| D872,573 S * | 1/2020 | Kestner | D9/430 |
| 10,830,450 B2 * | 11/2020 | Cadima | F24C 3/12 |
| 11,056,763 B2 * | 7/2021 | Nivala | H01Q 9/42 |
| 11,185,191 B2 * | 11/2021 | Laub | A47F 10/06 |
| D1,020,455 S * | 4/2024 | Kestner | D9/430 |
| 12,029,351 B2 * | 7/2024 | Smetana | A47J 36/32 |
| D1,064,814 S * | 3/2025 | Kestner | D9/430 |
| 2001/0007322 A1 * | 7/2001 | Shei | A47J 39/006 219/385 |
| 2001/0032546 A1 * | 10/2001 | Sharpe | A47J 45/068 99/422 |
| 2001/0038011 A1 * | 11/2001 | Hillis | B65D 19/18 220/6 |

(56) References Cited

U.S. PATENT DOCUMENTS

| | | | |
|---|---|---|---|
| 2002/0121509 A1* | 9/2002 | Shei | A47J 39/006 219/385 |
| 2002/0124737 A1* | 9/2002 | Bedetti | A47J 43/28 99/342 |
| 2003/0007544 A1* | 1/2003 | Chang | F24C 7/08 374/149 |
| 2003/0034898 A1* | 2/2003 | Shamoon | G08C 17/02 340/13.24 |
| 2003/0118706 A1* | 6/2003 | Veltrop | A47J 36/2483 426/418 |
| 2003/0169801 A1* | 9/2003 | Chilton | A47J 45/068 374/142 |
| 2003/0226657 A1* | 12/2003 | Wallace | F25D 11/003 165/202 |
| 2004/0016348 A1* | 1/2004 | Sharpe | A47J 36/321 99/422 |
| 2004/0020915 A1* | 2/2004 | Shei | F24C 7/087 219/400 |
| 2004/0056761 A1* | 3/2004 | Vaseloff | A47F 10/06 340/309.16 |
| 2004/0069155 A1* | 4/2004 | Shei | A21B 2/00 99/448 |
| 2004/0217116 A1* | 11/2004 | Offerman | B65D 43/12 220/345.2 |
| 2004/0221746 A1* | 11/2004 | Hansen | A22C 9/001 99/532 |
| 2005/0088069 A1 | 4/2005 | Greenwald et al. | |
| 2005/0193901 A1* | 9/2005 | Buehler | A23L 5/10 99/468 |
| 2005/0216349 A1* | 9/2005 | Vaseloff | G06Q 10/087 705/15 |
| 2005/0242086 A1* | 11/2005 | Imura | A47J 36/321 219/627 |
| 2006/0185523 A1* | 8/2006 | Wiedemann | G01K 3/005 99/331 |
| 2006/0185527 A1* | 8/2006 | Shei | F24C 7/087 99/467 |
| 2007/0012199 A1* | 1/2007 | Ho | A47J 45/068 99/422 |
| 2007/0017245 A1* | 1/2007 | Song | F25D 23/061 62/518 |
| 2007/0035920 A1 | 2/2007 | Peng et al. | |
| 2007/0144202 A1* | 6/2007 | Theodos | F24C 15/18 62/348 |
| 2007/0186570 A1* | 8/2007 | Kopf | F25D 21/08 62/344 |
| 2007/0209960 A1* | 9/2007 | Leoncavallo | A61J 1/16 220/4.27 |
| 2008/0007147 A1 | 1/2008 | Skog | |
| 2008/0008795 A1* | 1/2008 | Thorneywork | A23L 5/10 426/233 |
| 2008/0023462 A1* | 1/2008 | Shei | F24C 7/087 219/394 |
| 2008/0053983 A1* | 3/2008 | Stanger | A47J 39/006 219/393 |
| 2008/0156009 A1* | 7/2008 | Cur | F25D 16/00 62/185 |
| 2008/0156030 A1* | 7/2008 | Cur | F25D 11/027 62/441 |
| 2008/0213449 A1* | 9/2008 | Wisner | A47J 39/006 426/520 |
| 2008/0302778 A1* | 12/2008 | Veltrop | A47J 39/006 219/385 |
| 2009/0007797 A1* | 1/2009 | Ando | A21B 3/04 99/330 |
| 2009/0065307 A1* | 3/2009 | Boyden | A47J 36/2405 186/44 |
| 2009/0090252 A1* | 4/2009 | Ewald | A47J 36/2483 426/418 |
| 2009/0126580 A1* | 5/2009 | Hartfelder | A47J 39/006 99/483 |
| 2009/0199723 A1* | 8/2009 | Veltrop | A47J 39/006 206/557 |
| 2009/0199725 A1* | 8/2009 | Veltrop | A47J 37/0623 99/483 |
| 2009/0252842 A1* | 10/2009 | Wang | A47J 37/1271 426/244 |
| 2009/0266244 A1* | 10/2009 | Maciejewski | A47J 39/00 99/485 |
| 2010/0101254 A1* | 4/2010 | Besore | H02J 3/14 62/340 |
| 2010/0162747 A1* | 7/2010 | Hamel | F25D 17/065 62/455 |
| 2010/0186600 A1* | 7/2010 | Lewis | A47J 36/32 99/327 |
| 2010/0191474 A1* | 7/2010 | Haick | G01N 33/006 706/14 |
| 2010/0192609 A1* | 8/2010 | Chae | F25D 17/065 62/515 |
| 2010/0307188 A1* | 12/2010 | Kwon | F25D 23/028 62/449 |
| 2010/0326286 A1* | 12/2010 | Romero | A47J 27/18 99/330 |
| 2011/0011109 A1* | 1/2011 | Rafalovich | F25B 5/02 62/498 |
| 2011/0030565 A1* | 2/2011 | Shei | A47J 39/006 219/400 |
| 2011/0083564 A1* | 4/2011 | Kirby | A47J 39/006 99/468 |
| 2011/0171355 A1* | 7/2011 | Chung | A23L 5/15 392/416 |
| 2011/0239675 A1* | 10/2011 | Roekens | F25D 23/026 62/252 |
| 2011/0253698 A1* | 10/2011 | Theodos | A47J 39/006 219/385 |
| 2011/0253703 A1* | 10/2011 | Theodos | H05B 1/02 219/490 |
| 2011/0278278 A1* | 11/2011 | Emerich | A47J 39/006 219/400 |
| 2011/0283714 A1* | 11/2011 | Veltrop | F25D 23/003 165/104.19 |
| 2011/0283895 A1* | 11/2011 | Veltrop | A23B 2/05 392/416 |
| 2012/0023987 A1* | 2/2012 | Besore | F25D 29/00 62/157 |
| 2012/0076903 A1 | 3/2012 | Maciejewski et al. | |
| 2012/0261426 A1* | 10/2012 | Tomczyk | 220/592.01 |
| 2013/0027204 A1* | 1/2013 | Groth | H04M 15/49 340/8.1 |
| 2013/0277353 A1* | 10/2013 | Joseph | H05B 1/0263 219/209 |
| 2013/0278124 A1* | 10/2013 | Hu | H05K 7/1489 312/333 |
| 2013/0300276 A1 | 11/2013 | Nuss | |
| 2013/0319256 A1* | 12/2013 | Piazzi | A47J 37/0694 99/341 |
| 2014/0010937 A1* | 1/2014 | Stanger | A47J 39/003 426/520 |
| 2014/0144334 A1* | 5/2014 | Reese | A47J 36/2483 219/393 |
| 2014/0150461 A1* | 6/2014 | Veltrop | F25D 25/024 62/207 |
| 2014/0157998 A1* | 6/2014 | Roever | H05B 6/1245 99/483 |
| 2014/0182460 A1* | 7/2014 | Imura | A47J 45/068 99/342 |
| 2014/0231406 A1* | 8/2014 | Tsang | A61M 5/44 219/394 |
| 2014/0263269 A1* | 9/2014 | Veltrop | A47J 39/02 219/394 |
| 2014/0272023 A1* | 9/2014 | Zimmerman | A47J 31/56 426/231 |
| 2014/0345474 A1* | 11/2014 | Trench Rocha | A47J 44/00 99/348 |
| 2014/0348987 A1* | 11/2014 | Cheng | A47J 27/08 99/331 |

(56) References Cited

U.S. PATENT DOCUMENTS

| | | | |
|---|---|---|---|
| 2014/0352549 A1* | 12/2014 | Upston | A47J 37/0857 |
| | | | 99/334 |
| 2015/0102717 A1 | 4/2015 | Furr et al. | |
| 2015/0201749 A1* | 7/2015 | Turner | A47J 36/2483 |
| | | | 62/3.61 |
| 2015/0245723 A1* | 9/2015 | Alexander | A47J 39/025 |
| | | | 219/387 |
| 2015/0253065 A1 | 9/2015 | Min et al. | |
| 2015/0257573 A1* | 9/2015 | Gabara | A47J 27/04 |
| | | | 126/379.1 |
| 2015/0327726 A1* | 11/2015 | Betzold | A47J 39/02 |
| | | | 99/483 |
| 2016/0037918 A1* | 2/2016 | Greer | A47B 31/00 |
| | | | 312/283 |
| 2016/0037966 A1* | 2/2016 | Chin | A47J 37/0682 |
| | | | 99/333 |
| 2016/0073821 A1* | 3/2016 | Shei | A47J 36/34 |
| | | | 220/573.1 |
| 2017/0071408 A1* | 3/2017 | Veltrop | A47J 39/006 |
| 2017/0071410 A1* | 3/2017 | Veltrop | A47J 39/006 |
| 2017/0150843 A1* | 6/2017 | Rosalia | A47J 27/13 |
| 2017/0290466 A1* | 10/2017 | Lundberg | H05B 1/0252 |
| 2017/0332842 A1* | 11/2017 | Laub | A47F 10/06 |
| 2018/0103802 A1* | 4/2018 | Kothari | A47J 39/006 |
| 2018/0103803 A1* | 4/2018 | Laub | A47J 39/006 |
| 2019/0075970 A1* | 3/2019 | Patterson | A47F 10/06 |

FOREIGN PATENT DOCUMENTS

| | | |
|---|---|---|
| GB | 616570 | 1/1949 |
| GB | 829729 | 3/1960 |
| WO | 00/57709 | 10/2000 |
| WO | 2007/047597 A2 | 4/2007 |

OTHER PUBLICATIONS

Hunt, U.S. Pat. No. 466,416 patented Jan. 5, 1892, 3 pages.
Simmons, U.S. Pat. No. 688,010 patented Dec. 3, 1901, 3 pages.
Monsen et al., U.S. Pat. No. 740,677 patented Oct. 6, 1903, 3 pages.
Favorite et al., U.S. Pat. No. 804,110 patented Nov. 7, 1905, 4 pages.

* cited by examiner

PAN STORAGE APPARATUS

CROSS-REFERENCE TO RELATED APPLICATION

This application claims priority to U.S. Provisional Application No. 63/141,510, filed Jan. 26, 2021, the entirety of which is hereby incorporated by reference.

FIELD

The present disclosure generally relates to pan storage and, more particularly, to apparatus and methods for supporting and covering open top pans, such as open top food storage pans.

BACKGROUND

Many types of containers have an open top and a lid for covering the open top for storing items therein. For example, some containers having an open top and lid may be used for storing food. It may be desirable to store food in such a container before preparing, serving, and/or consuming the food.

SUMMARY

In one aspect, an apparatus for storing a pan with an open top comprises a housing having a pan storage space with a front pan receiving opening configured to permit the pan to be inserted into and removed from the pan storage space. The apparatus includes a pan support surface configured to support the pan when the pan is in the pan storage space. A cover is receivable in the pan storage space and configured to at least partially cover the open top of the pan when the pan is in the pan storage space. At least one cover support is coupled to the housing and has a holder with a support surface configured to support the cover in the pan storage space. The holder and the cover are arrangeable relative to one another such that the holder and the cover engage one another to retain the cover in the pan storage space when the pan moves in the pan storage space.

In another aspect, an apparatus is for storing pans of different sizes having open tops. The apparatus comprises a housing having a pan storage space with a front pan receiving opening configured to permit the pans to be inserted into and removed from the pan storage space. The apparatus includes a pan support surface configured to support the pans when the pans are in the pan storage space. The apparatus includes a first cover having a first cover size and shape to cover a first pan of a first pan size. The apparatus includes a second cover having a second cover size and shape to cover a second pan of a second pan size different than the first pan size, the second cover size being different than the first cover size. A plurality of cover supports are coupled to the housing and configured to support the first and second covers in the pan storage space. The plurality of cover supports include a first cover support group configured to support the first cover and a second cover support group configured to support the second cover.

In another aspect, an apparatus is for storing a plurality of pans having open tops. The apparatus includes a housing having a pan storage space sized and shaped to receive the plurality of pans. The pan storage space has a front pan receiving opening configured to permit the pans to be inserted into and removed from the pan storage space. A pan support surface is configured to support the pans when the pans are in the pan storage space. A first cover is receivable and supportable in the pan storage space and configured to at least partially cover the open top of a first pan when the first cover is supported in and the first pan is in the pan storage space. The first cover includes a first divider for dividing the pan receiving space. A second cover is receivable and supportable in the pan storage space and configured to at least partially cover the open top of a second pan when the second cover is supported in and the second pan is in the pan storage space. The second cover includes a second divider for dividing the pan receiving space. The first and second covers are configured to be supported in the pan storage space in a first cover arrangement in which the first and second covers are supported and arranged in the pan storage space such that the first and second dividers divide the pan storage space into a first pan subspace sized to receive the first pan and a second pan subspace sized to receive the second pan. The first and second covers are configured to be supported in the pan storage space in a second cover arrangement in which the first and second covers are arranged in the pan storage space such that the first and second dividers divide the pan storage space into a third pan subspace sized to receive a third pan of a size different than at least one of the first or second pans.

In another aspect, an apparatus is for storing a pan with an open top. The apparatus comprises a housing having a pan storage space with a front pan receiving opening configured to permit the pan to be inserted into and removed from the pan storage space. A pan support surface is configured to support the pan when the pan is in the pan storage space. A cover is disposed in the pan storage space and configured to at least partially cover the open top of the pan when the pan is in the pan storage space. A primary retainer is configured to retain the cover in the pan storage space when the pan moves in the pan storage space. A secondary retainer is configured to retain the cover in the pan storage space when the pan moves in the pan storage space and the primary retainer fails to retain the cover in the pan storage space.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
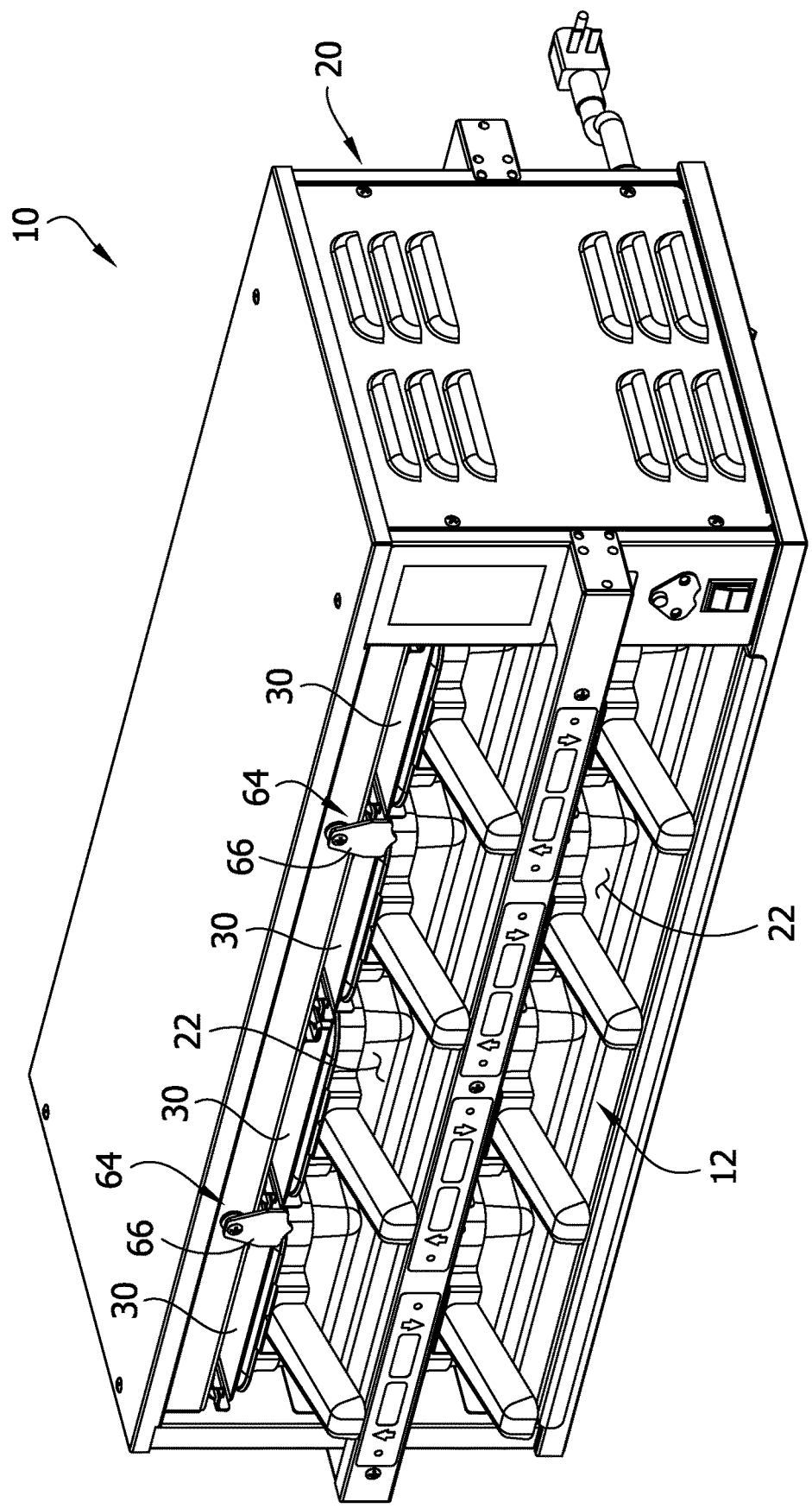
FIG. 1 is a front perspective of a pan storage apparatus according to one embodiment of the present disclosure.
Figure 2:
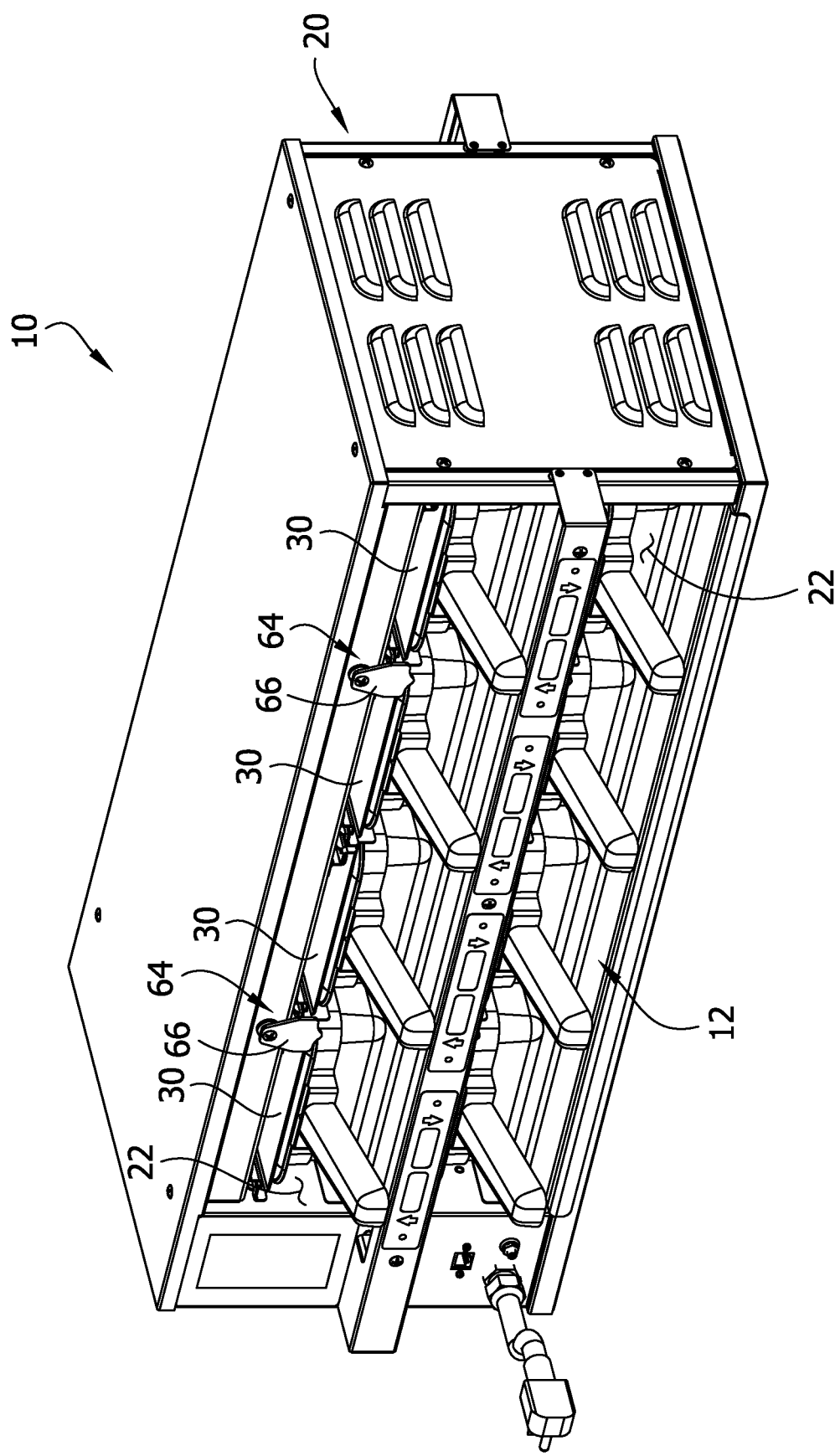
FIG. 2 is a rear perspective of the pan storage apparatus.

Referring to FIGS. 1 and 2, a pan storage apparatus according to one embodiment of the present disclosure is generally indicated by the reference number 10. For example and without limitation, the pan storage apparatus 10 may be used in the food service industry for food storage, such as for storing food in one or more pans 12 (FIG. 3) in an ambient, cool, or warm temperature environment. As will become apparent, contents stored in a pan 12 in the pan storage apparatus 10 can be accessed by pulling the pan forward (e.g., outward) from a stowed position to expose an open top of the pan and its contents therein, and the pan can be pushed rearward (e.g., inward) to return the pan to its stowed position, or the pan can be removed from the pan storage apparatus. It will be understood the pan storage apparatus 10 may be used for other purposes without departing from the scope of the present disclosure.

The pan storage apparatus 10 includes a housing or cabinet 20. The housing 20 includes top, bottom, left, right, front, and rear walls, defining an interior of the housing. The housing 20 includes an upper compartment and a lower compartment, each defining a pan storage space 22. Each pan storage space 22 is sized and shaped to receive at least one pan 12 and more desirably a plurality of pans. In FIGS. 1 and 2, four pans 12 are shown received in each of the respective pan storage spaces 22. Both of the compartments (e.g., pan storage spaces 22) have an open front and an open back permitting the pans 12 to be inserted in and accessed from either the front or back of the housing. Accordingly, the pan storage space 22 has a front pan receiving opening (FIG. 1) configured to permit the pans 12 to be inserted into and removed from the pan storage space. Likewise, the pan storage space 22 has a rear pan receiving opening configured to permit the pans 12 to be inserted into and removed from the pan storage space. Other configurations and arrangements (e.g., permitting access from the front only) may be used without departing from the scope of the present disclosure. Each compartment includes a left side wall, a right side wall, a bottom or lower wall, and an upper wall 24 defining the pan storage space 22. The bottom wall defines a pan support surface configured to support the pan 12 when the pan is in the pan storage space 22. The pan support surface is generally horizontal (e.g., lies in a generally horizontal plane). It will be understood that compartments having other configurations can be used without departing from the scope of the present disclosure.

The pan 12 is selectively receivable in and removable from the pan storage space 22. The pan storage space 22 includes the front opening and the rear opening permitting the pan 12 to be inserted into the pan storage space from the front and the back of the pan storage space. The front opening will be described in further detail herein, with the understanding that the rear opening has essentially the same configuration. The front opening includes a lower portion sized to permit the pan 12 to be received in the pan storage space 22 from the front of the pan storage space through the pan receiving opening. The pan support surface is generally a slide surface constructed to slidably receive and support the bottom of the pan 12 in the pan storage space 22. As the pan 12 is inserted into the pan storage space 22 though the lower portion of the front opening, the pan can be slid along the pan support surface and rest in the pan storage space on the pan support surface. Desirably, the lower portion of the front opening has a width and a height generally corresponding to or greater than a width and a height of the pan 12, and the pan support surface has a width and a length at least as great as the width and length of the bottom of the pan. Other pan receiving openings and pan support surfaces and dimensions can be used without departing from the scope of the present disclosure. For example, the pan support surface may comprise two pan support surfaces configured to slidably receive and support the rim of the pan 12.

In the illustrated embodiment, the pan storage apparatus 10 is configured for holding food at a warm temperature. In the illustrated embodiment, the upper wall 24 of each compartment is part of an upper wall assembly 26. In addition to the upper wall 24, the upper wall assembly 26 includes a heating element 28 (broadly, a food temperature conditioning element), such as an electrical resistance heater to heat the pans 12 and the food container therein. The use of other heating elements (e.g., infrared heat emitters) instead of or in addition to the heating element 28 is within the scope of the present disclosure. In one embodiment, each compartment may include a heat sink (not shown) to be heated by the heating element 28 to help heat the pans 12. It will be appreciated that the heating elements 28 or other food temperature conditioning element(s) could be located below the pan instead of above the pan. It will be understood that the food may be held in an ambient, heated, or cooled temperature environment (e.g., using one or more (or no) heating and/or cooling food temperature conditioning elements) without departing from the scope of the present disclosure.

Figure 3:
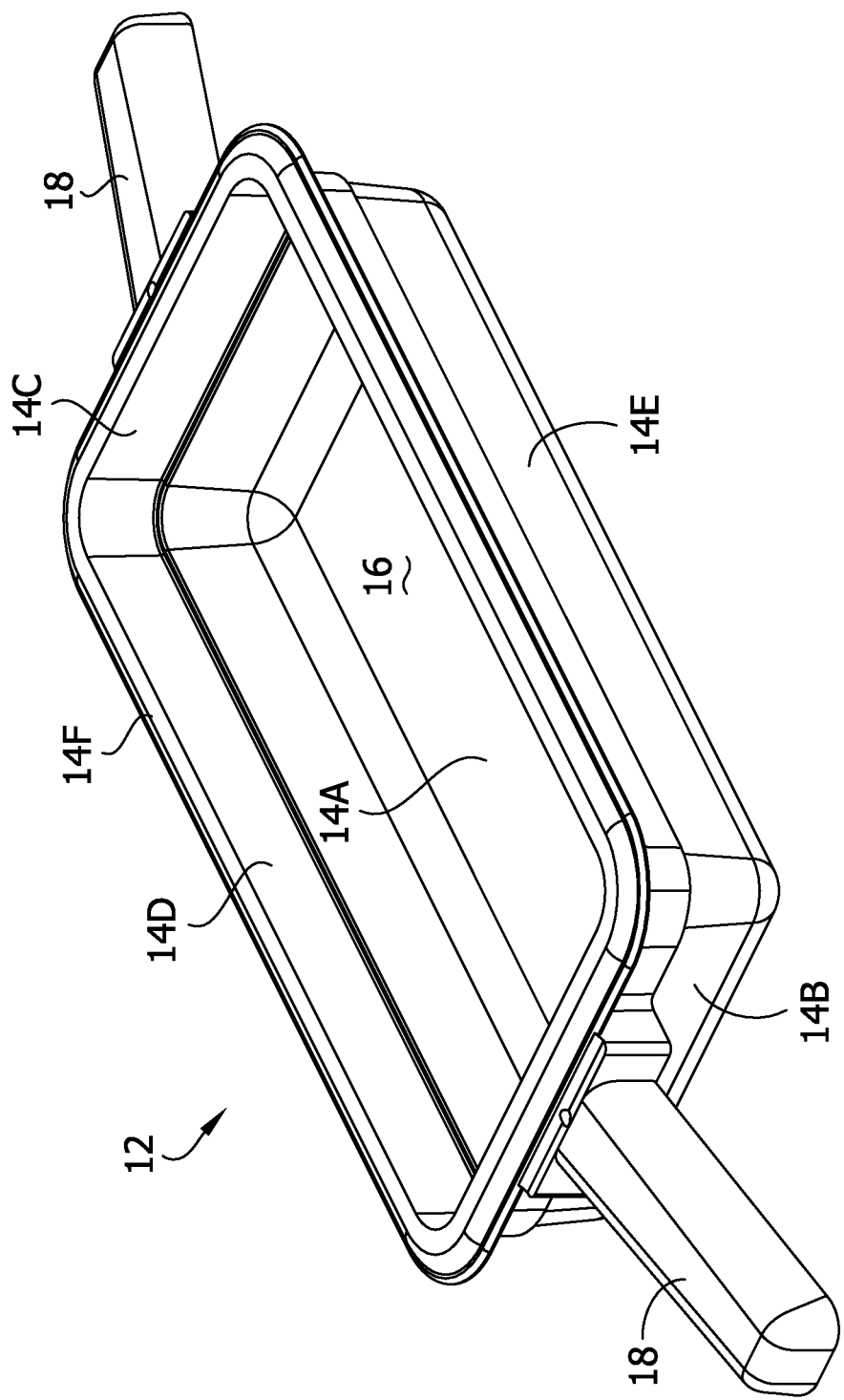
FIG. 3 is a perspective of a pan for use with the pan storage apparatus.

Referring to FIG. 3, a pan 12 according to one embodiment of the present disclosure for use with the pan storage apparatus 10 is generally shown. The pan 12 is generally rectangular and includes a bottom or lower wall 14A, a front or first end wall 14B, a rear or second end wall 14C, left and right side walls 14D, 14E, defining an interior 16 of the pan, and an open top providing access to the interior. The interior 16 is sized and shaped to hold food therein. Food can be inserted and removed from the interior 16 through the open top. The pan 12 includes a peripheral rim 14F extending around the periphery of the pan adjacent the open top. The rim 14F extends outboard of the front, rear, and left and right side walls 14B-14E and includes front, rear, left, and right rim portions corresponding to the respective sides of the pan 12. Handles 18 are provided at the front and rear of the pan 12. The pan 12 may be made of any suitable material, such as a type of plastic.

Pans 12 can have any one of a variety of different sizes (e.g., a first pan size, a second pan size, a third pan size, a fourth pan size, etc.). In the illustrated embodiment, the pan 12 is what is commonly known in the industry as a ⅓ size pan 12A (e.g., a first pan size). Typically, ⅓ size pans 12A have a length of about 12 inches and a width of about 6⅔ inches. The pan storage apparatus 10 can also be used to hold ½ size pans 12B (e.g., a second pan size), ⅔ size pans 12C (e.g., a third pan size), full size pans 12D (e.g., a fourth pan size), etc. A ½ size pan 12B, ⅔ size pans 12C and a full size pan 12D are shown schematically in FIGS. 10-14. The fraction portion (e.g., ⅓) of the pan size type indicates the size of the pan in relation to a full size pan 12D. For example, ⅓ size pans 12A are so named because they are ⅓ the size of a full size pan 12D. Accordingly, three ⅓ size pans 12A can fit in the same space as one full size pan 12D. The pans 12A-D all have generally the same configuration or construction, just different sizes (e.g., different widths). For example, pans 12A-D all have the same height, such as a height of about 4 inches. Typically, ½ size pans 12B have a length of about 12 inches and width of about 10 inches, ⅔ size pans 12C have a length of about 12 inches and a width of about 13⅓ inches, and full size pans 12D have a length of about 12 inches and a width of about 20 inches. Pans having other configurations may be used without departing from the scope of the present disclosure, such as the configurations described herein. As used herein, the reference numeral "12" refers to all sizes and types of pans (e.g., pans 12A-D) for use with the pan storage apparatus 10 and the reference numeral "12" followed by a letter, such as "A," refers to a particular size of pan, such as a ⅓ size pan.

Figure 4:
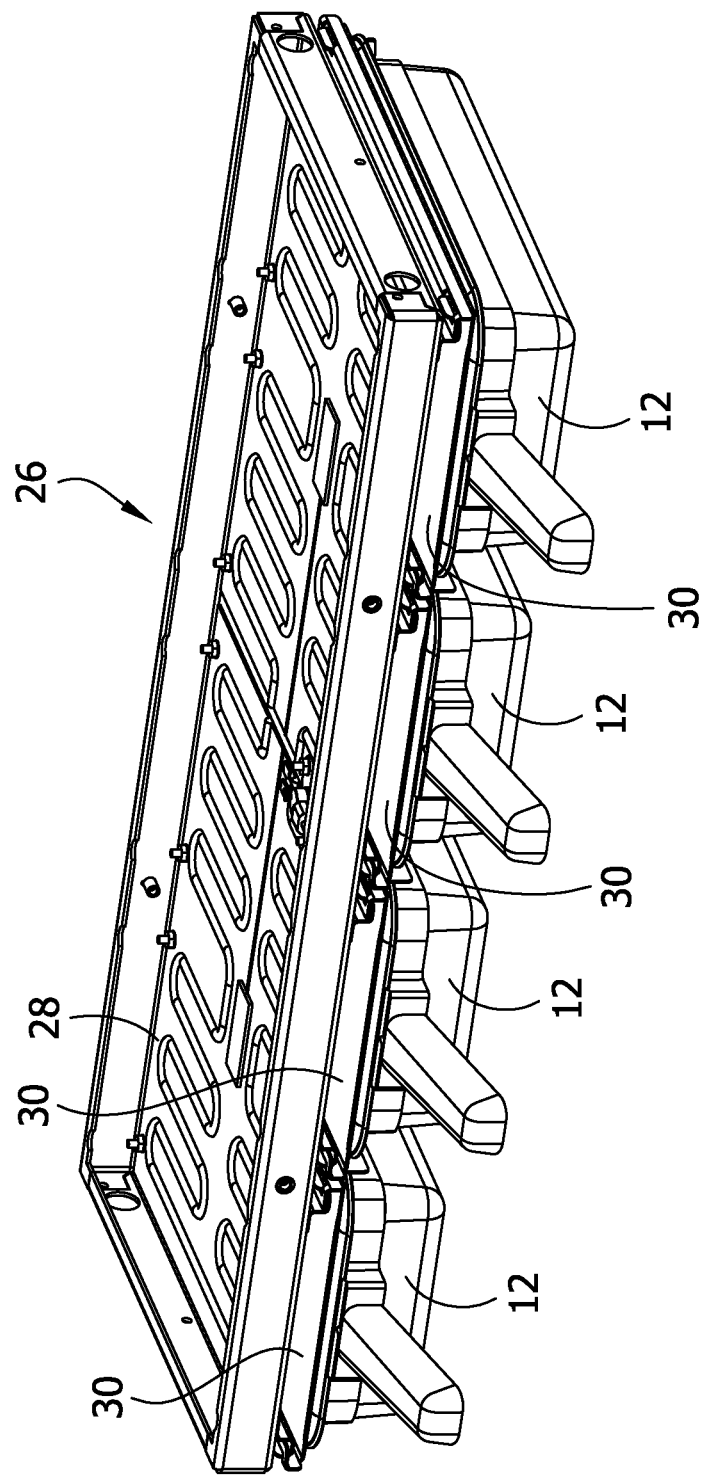
FIG. 4 is a perspective of an upper wall assembly of the pan storage apparatus supporting covers with pans covered by the covers, other components of the pan storage apparatus being hidden from view to show interior details.
Figure 5:
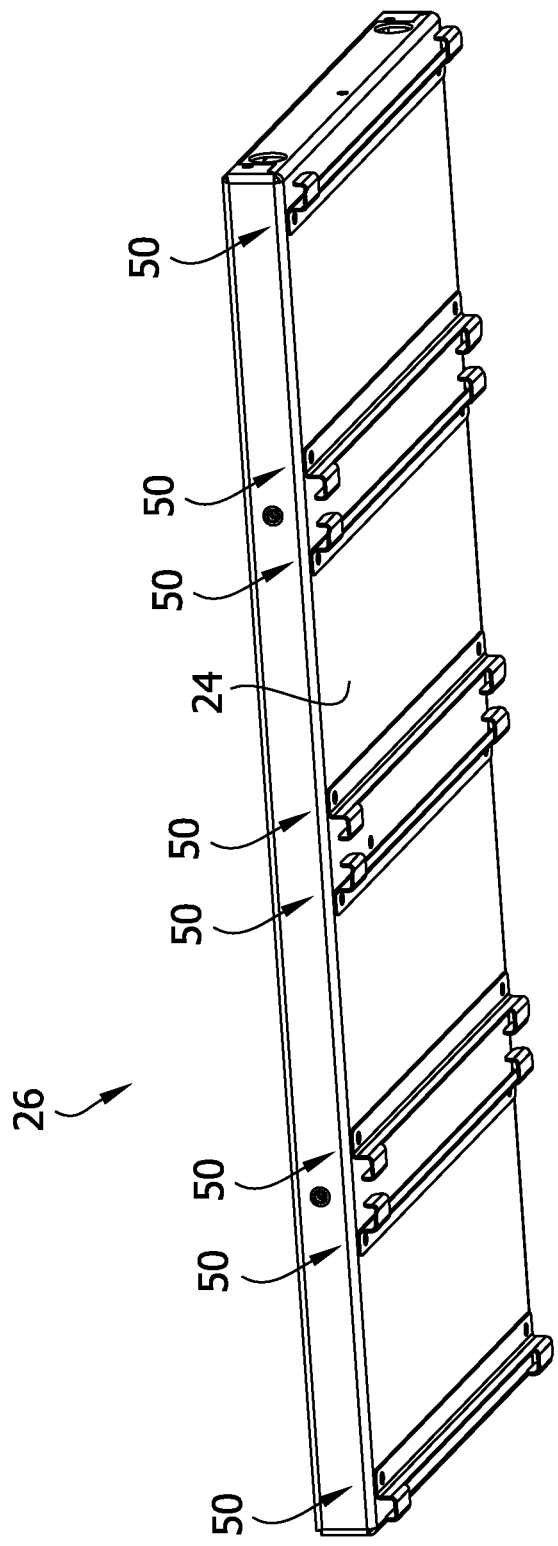
FIG. 5 is an upwardly looking perspective of the upper wall assembly.
Figure 6:
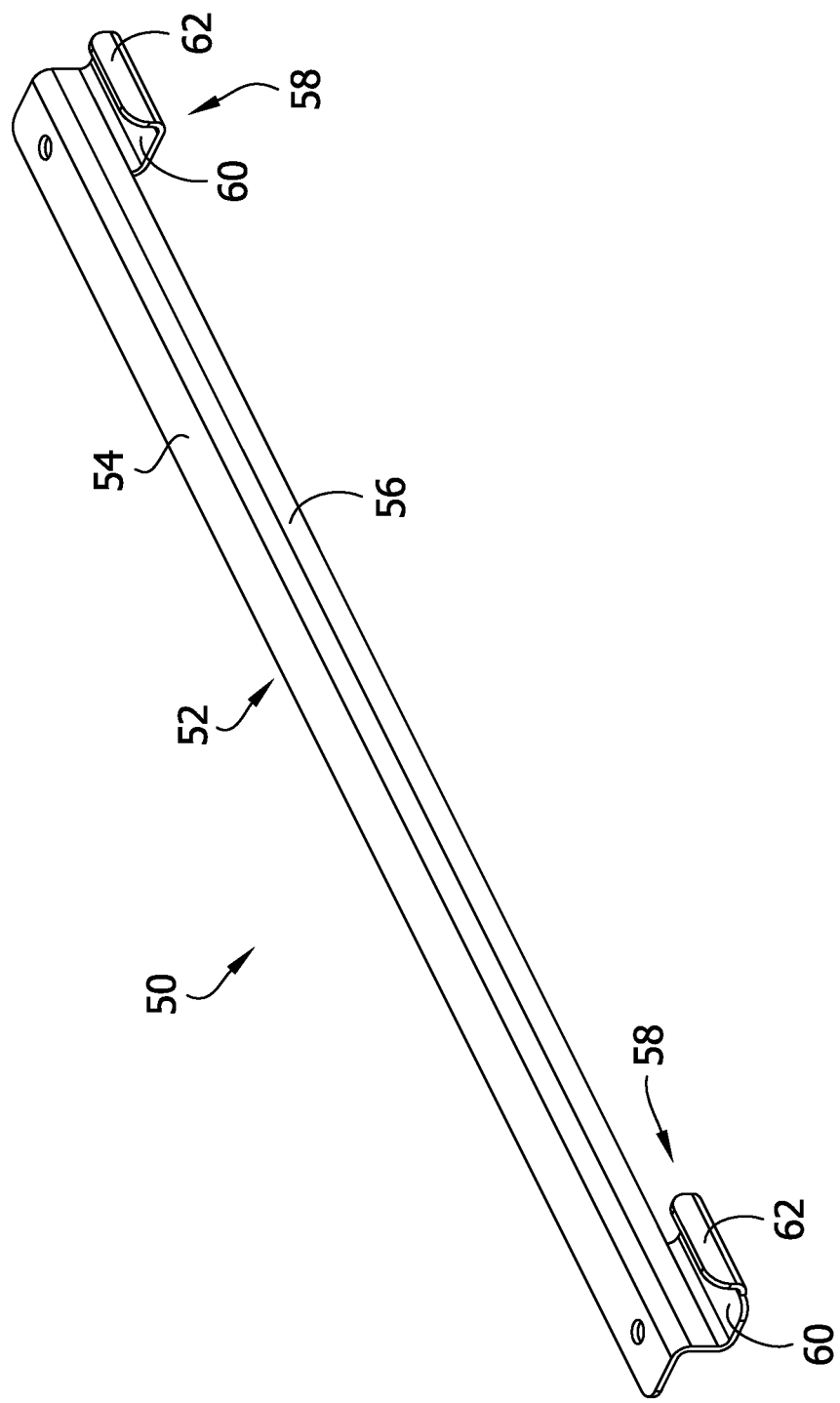
FIG. 6 is a perspective of a cover support of the pan storage apparatus.

Referring to FIGS. 1, 2 and 4, the pan storage apparatus 10 includes pan covers 30 for covering pans 12 thereunder. The covers 30 are supported (e.g., disposed) in the pan storage spaces 22. The covers 30 are configured to at least partially, and more desirably, fully, cover the open tops of the pans when the pans are in the pan storage space 22. In this embodiment, four covers 18 are shown in each pan storage space 22 for covering the four pans 12 received therein. As will become apparent, other configurations and/or arrangements of the covers 18 are possible to accommodate pans 12 of different sizes (e.g., pans 12A-D).

Figure 7:
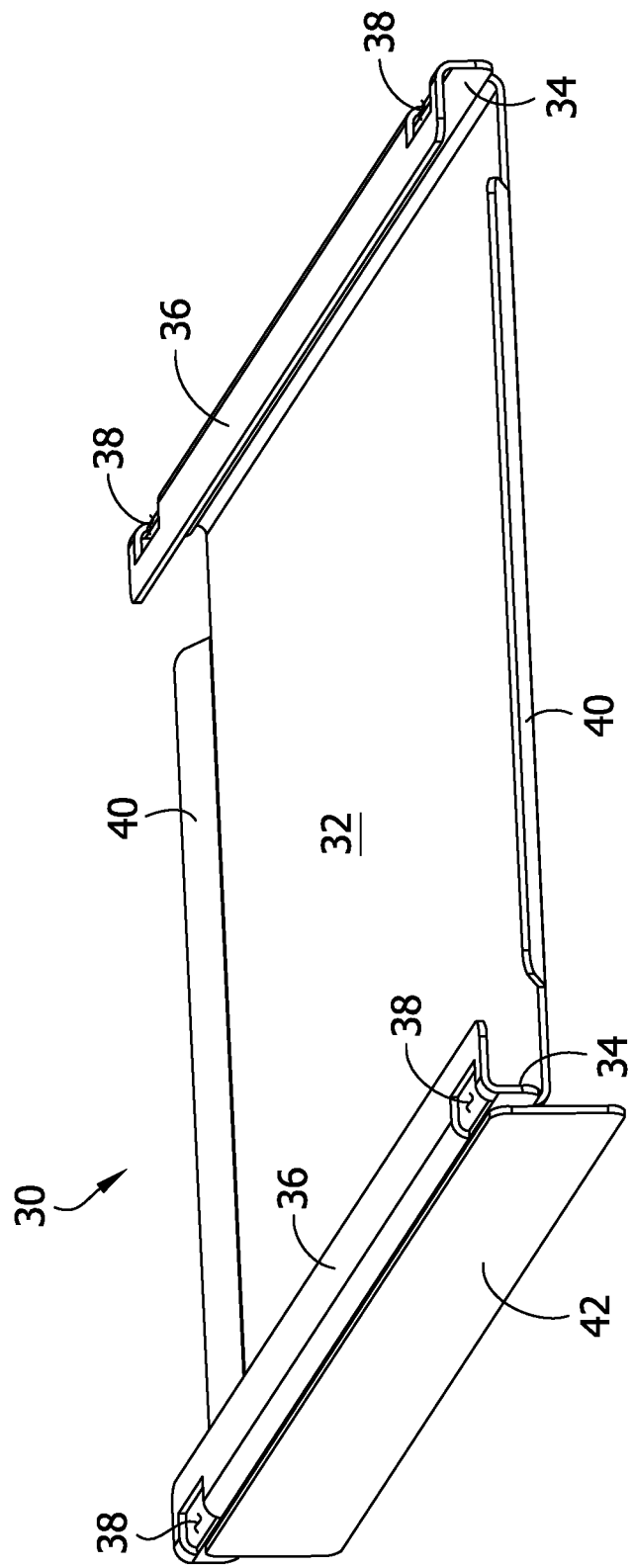
FIG. 7 is a perspective of a cover of the pan storage apparatus.

Referring to FIG. 7, an example cover or lid 30 is shown in closer detail. The cover 30 is sized and shaped to cover the pan 12. The cover 30 is generally rectangular. The cover 30 includes a generally rectangular base or pan covering portion 32. The pan covering portion 32 has opposite front and rear edge margins and opposite left and right (e.g., first and second) side edge margins. The pan covering portion 32 is sized and shaped to cover the open top of the pan 12. The pan covering portion 32 includes a generally rectangular lower or pan engagement surface for engaging the pan rim 14F around the periphery of the pan rim to substantially seal (e.g., by the force of gravity on the cover 30) around the open top of the pan. In the illustrated embodiment, the pan covering section 32 (e.g., pan engagement surface) is substantially planar. Other configurations may be used without departing from the scope of the present disclosure. For example, the cover 30 may not be constructed to engage the pan 12 and/or may be constructed to permit venting from the open top of the pan, as described in more detail below. It will be appreciated that the cover can at least partially cover the open top of the pan without engaging the pan or engaging only part of the pan rim for permitting the interior of the pan to vent out of the open top.

The cover 30 includes left and right (e.g., first and second) side flanges 34 extending generally upward from the respective left and right side edge margins of the pan covering portion 32. The side flanges 34 are generally planar and are generally perpendicular (nonparallel) to the pan covering portion 32. The cover 30 includes left and right (e.g., first and second) upper flanges 36 extending inward (e.g., toward one another) from the upper edge margins of the left and right side flanges 34. The upper flanges 36 are generally planar, are generally perpendicular (nonparallel) to the side flanges 34 and are generally parallel to the pan covering portion 32. Desirably, the upper flanges are co-planar. The upper flanges 36 overly the pan covering portion 32. Accordingly, the cover 30 has generally U-shaped sides defining a space or channel extending along the side of the cover used to mount the cover to the pan support apparatus, as explained in more detail below. Each upper flange 36 defines at least one opening 38 (e.g., slot). In the illustrated embodiment, each upper flange 36 defines two slots 38, one generally adjacent the front of the cover 30 and the other generally adjacent the rear of the cover. As explained in more detail below, the slots 38 are used to help retain the cover 30 in the pan storage space 22 when pans 12 are inserted into and removed from the space. The cover 30 may also include a front and rear lift flanges 40 extending generally forward and rearward, respectively, and upward from the front and rear edge margins, respectively, of the pan covering portion 32. As will become apparent, the lift flanges 40 facilitate lifting of the cover 30 as the pan 12 is inserted in to the pan receiving space 22 to permit the pan to enter the pan receiving space. The lift flanges 40 are generally planar and extend at a non-orthogonal skew angle (e.g., 45 degree angle) relative to the pan covering portion 32.

Figure 9:
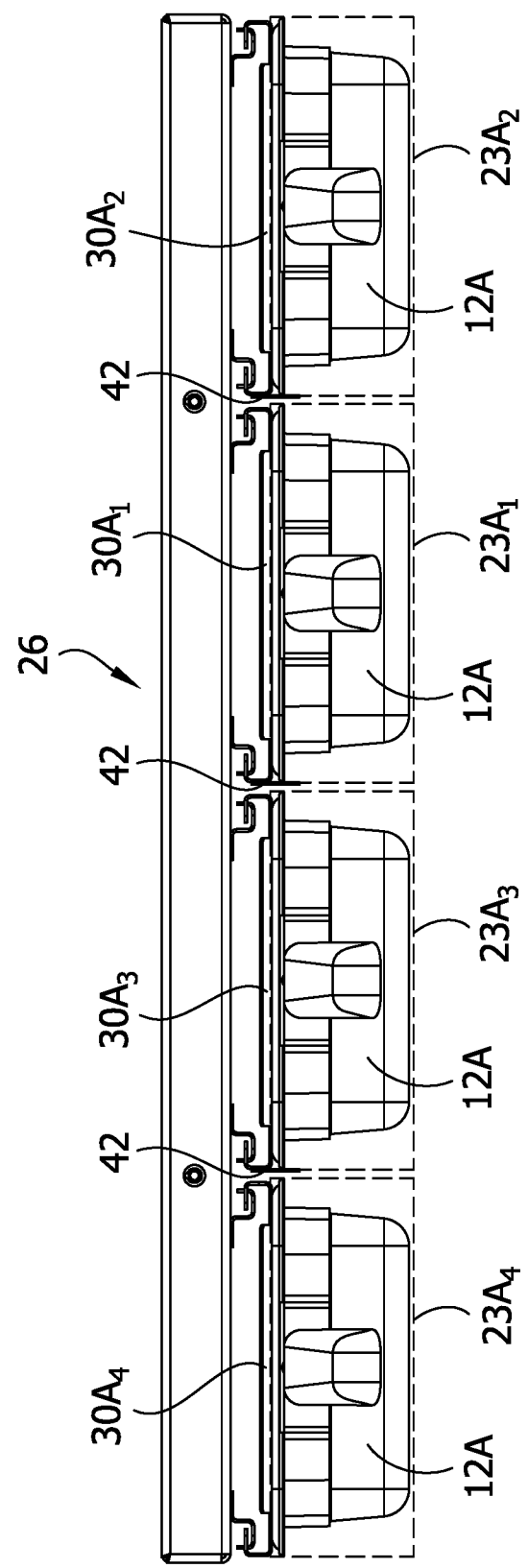
FIG. 9 is a front view of the upper wall assembly supporting the covers in an arrangement to cover pans of a first size.

In the illustrated embodiment, the cover 30 shown in FIG. 7 includes a partition or divider 42 configured to divide the pan receiving space 22, as described in more detail below. The divider 42 is generally planar and extends generally vertically. The divider 42 is configured to be disposed between two adjacent pans 12. The divider 42 is attached to one of the side flanges 34 and extends downward therefrom. The divider 42 is configured to engage the pan 12 underlying the cover 30 to help keep and position the pan under the cover. Moreover, the divider 42 acts as a guide for the pan 12 when the pan is inserted into and removed from the pan storage space 22 and generally keeps the pan from contacting other pans. In other embodiments, the cover 30 may not include a divider. See for example the left-most cover in FIG. 9. It is understood not all the covers 30 of the pan holding apparatus 10 may have dividers 42. For example, as shown in FIG. 9, the pan holding apparatus 10 includes three identical covers 30 with dividers 42 and one cover without a divider. In other embodiments, all the covers 30 may include dividers.

The covers 30 of the pan holding apparatus 10 can have different sizes and shapes to cover pans 12 of different sizes. For example, the cover 30 shown in FIG. 7 is a ⅓ size cover 30A (e.g., a first cover size) sized and shaped to cover a ⅓ size pan 12A. The pan storage apparatus 10 can also be used with covers 30 of other sizes (e.g., a first cover size, a second cover size, a third cover size, etc.). For example, the pan storage apparatus 10 can be used with ⅔ size covers 30B (e.g., a second cover size), full size covers 30C (e.g., a third cover size), etc. A full size cover 30C and ⅔ size covers 30B are shown schematically in FIGS. 12-14. Generally, the ⅔ size cover 30B is sized and shaped to cover a ⅔ size pan 12C and a full size cover 30C is sized and shaped to cover a full size pan 12D. However, it is understood that larger covers 30 can be used to cover smaller pans 12. For example, a ⅔ size cover 30B can be used to cover a ½ size pan 12B. As with the pans 12, the fraction portion (e.g., ⅓) of the cover size type indicates the size of the cover 30 in relation to a full size cover 30C and therefore the corresponding size (e.g., maximum size) of the pan the cover is configured to cover. The covers 30A-C all have generally the same configuration or construction, just different sizes (e.g., different widths). Covers having other configurations may be used without departing from the scope of the present disclosure. The cover 30 may be formed of any suitable material, such as aluminum, stainless steel, another type of metal, or a type of plastic. As used herein, the reference numeral "30" refers to all sizes and types of covers (e.g., covers 30A-C) for use with the pan storage apparatus 10 and the reference numeral "30" followed by a letter, such as "A," refers to a particular size of cover, such as a ⅓ size cover.

Like the pan 12, the cover 30 is selectively receivable in and removable from the pan storage space 22. The pan storage space 22 includes the front opening and the rear opening permitting the cover 20 to be inserted into the pan storage space from the front and the back of the pan storage space. The front opening (with the rear opening having essentially the same configuration) of the pan storage space 22 includes an upper portion located above the lower portion. In the illustrated embodiment, the upper and lower portions are non-overlapping sections of the front opening. The upper portion of the front opening is sized to permit the cover 30 to be received in the pan storage space 22 from the front of the pan storage space through the upper portion of the front opening. Desirably, the upper portion of the front opening has a width and a height generally corresponding to or greater than a width and height of the cover 30.

Referring to FIGS. 4-8, the covers 30 are suspended in the pan storage space 22. The pan holding apparatus includes a plurality (broadly, at least one) of cover supports 50. The cover supports 50 support the covers 30 in the pan storage space 22. The cover supports 50 are coupled to the housing 20. Specifically, the cover supports are part of the upper wall assembly 26 and are coupled to the upper wall 24. Accordingly, the cover supports 50 are disposed in the pan storage space 22. The cover support 50 includes a rail 52 mounted to the upper wall 24. The rail 52 includes a front end adjacent to the front opening and a rear end adjacent to the rear opening. In the illustrated embodiment, the rail 52 includes a mounting flange 54 and a side flange 56 extending generally downward from the mounting flange. The mounting flange 54 and side flange 56 are generally planar and perpendicular (nonparallel) to one another. The cover support 50 includes at least one holder 58 configured to support and retain the cover in the pan storage space 22. In the illustrated embodiment, the cover support 50 includes two holders 58 spaced apart from one another. In the illustrated embodiment, the holders 58 are disposed at each end of the rail 52. In the illustrated embodiment, the holder 58, in combination with the side flange 56, has a generally hook shape (e.g., J-hook shape). Cover supports 50 of the present disclosure are generally easier to clean than conventional supports because the cover supports of the present disclosure do not have or define (either by itself or with other components) long, narrow channels or openings that can be difficult to access for cleaning.

The holder 58 and the cover 30 are arranged relative to one another such that the holder and the cover engage one another to retain the cover in the pan storage space 22 when the pan moves in the pan storage space. The holder 58 is configured to extend through the cover 30 and retain the cover in the pan storage space 22 when the pan moves in (e.g., into or out of) the pan storage space. The holder 58 is also configured to support the cover 30 in the pan storage space 22. The holder 58 includes a support flange 60 extending generally horizontally from a lower edge margin of the side flange 56. The support flange 60 is generally planar. The support flange 60 defines (e.g., includes) a cover support surface (e.g., the upper surface of the support flange) of the cover support 50 configured to engage and support the cover 30 when the cover is in the pan storage space 22. The cover support surface is generally horizontal. The holder 58 also includes at least one retainer flange 62 (broadly, "retainer") extending generally upward from a side edge margin of the support flange 60. For reasons that will become apparent, the retainer 62 may be considered a first or primary retainer. The retainer flange 62 is configured to extend through the cover 30 (e.g., the opening 38) when the cover is supported by the cover support 50. The retainer flange 62 defines (e.g., includes) at least one retainer surface configured to engage the cover 30 (e.g., the edges of the opening 38) to retain the cover in the pan storage space 22. In the illustrated embodiment, the retainer flange 62 includes a front retainer surface and a rear retainer surface. The front retainer surface is the front edge of the retainer flange 62 and the rear retainer surface is the rear edge of the retainer flange. The front retainer surface faces forward and generally inhibits the cover 30 from moving rearward. The rear retainer surface faces rearward and generally inhibits the cover from moving forward. The retainer surfaces are generally vertical (e.g., lie in a vertical plane). In the illustrated embodiment, the holder 58 includes two retainer flanges 62 at the front and rear ends of the holder.

Figure 8:
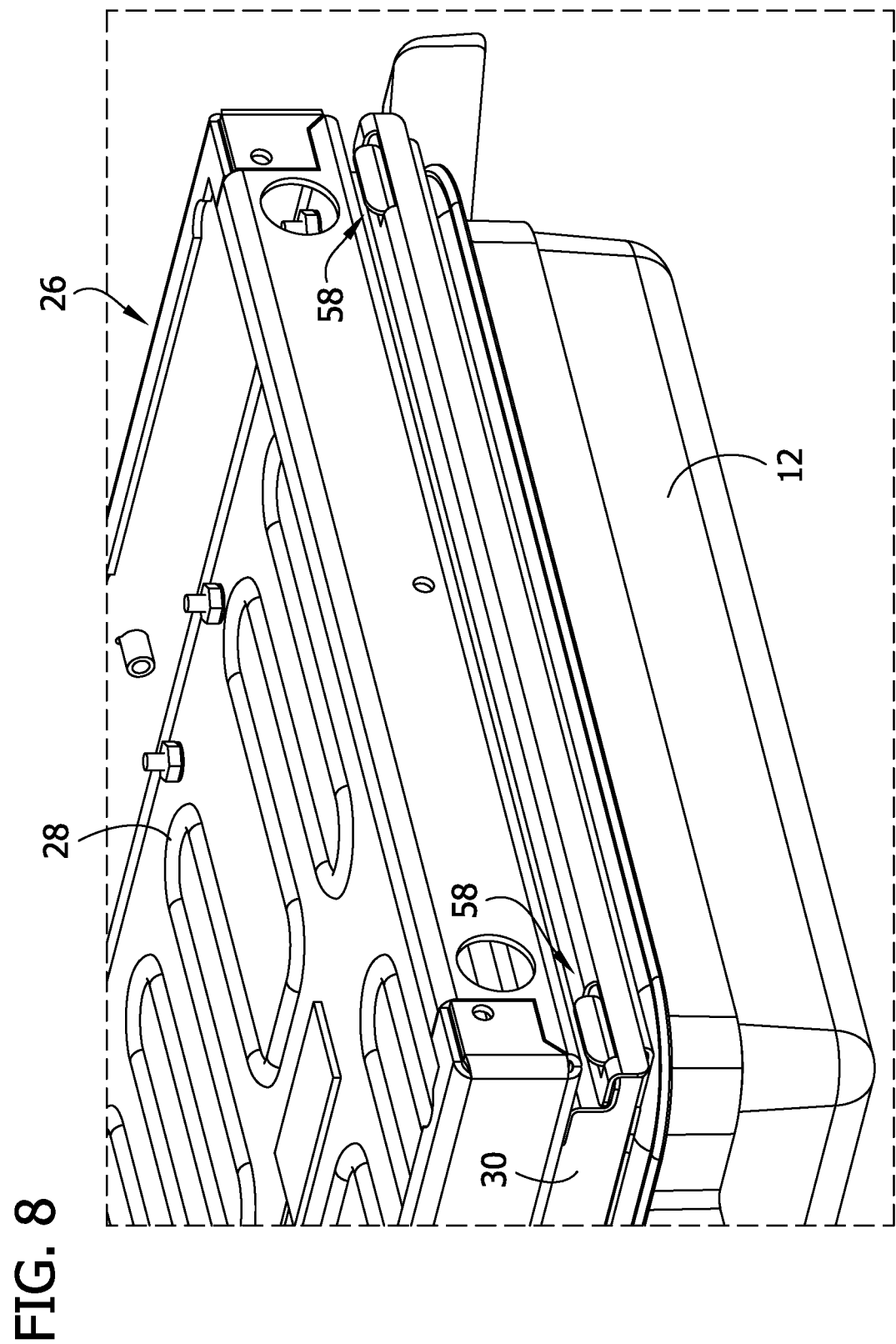
FIG. 8 is an enlarged perspective of FIG. 4.

In the illustrated embodiment, the pan holding apparatus 10 includes eight cover supports 50. The cover supports 50 are arranged so that two cover supports (e.g., left and right or first and second cover supports) support one cover 30. The two cover supports 50 are arranged to support opposite sides of the cover 30. One cover support 50 supports the left side of the cover 30 and the other cover support 50 supports the right side of the cover. When the cover 30 is supported in the pan storage space 22 by the two cover supports 50, the cover rests on the cover support surfaces of the cover supports. One upper flange 36 rests on the cover support surfaces of one of the cover supports 50 and the other upper flange rests on the cover supports surface of the other cover support. In this position, the holders 58 extend through the openings 38 of the cover 30 (FIG. 8). In the illustrated embodiment, the four holders 58 of the two cover supports 50 extend through the four openings 38 in the cover 30.

To position the cover 30 in the pan storage space 22, the cover 30 is moved into the pan storage space through generally the upper portion of the front or rear opening and arranged with respect to the two cover supports 50 that will support the cover such that the holders 58 are aligned with the openings 38. In particular, the cover 30 is positioned so that the upper flanges 36 are disposed above the holders 58 and so that both cover supports 50 are positioned inward of the side flanges 34. When aligned, the cover 30 is lowered until the cover rests on the cover support surfaces of the cover supports 50 (e.g., holders 58). This can be referred to as a retained position of the cover 30. As the cover 30 is lowered, the holders 58 extend into and through the openings 38.

To remove the cover 30 in the pan storage space 22 (e.g., for cleaning, rearrangement or replacement), the cover 30 is lifted or raised until the holders 58 no longer extend into or through the openings 38 (e.g., the retainers are out of horizontal registration with and below the edges of the openings of the cover). This can be referred to as a non-retained position of the cover 30. When the cover 30 is clear of the holders 58, the cover is moved out of the pan storage space 22 through the front or rear opening (e.g., upper portion thereof). The cover 30 can be moved in either a generally forward or rearward direction.

When the cover 30 is in the pan storage space 22, the retainers 62 of the two cover supports 50 retain the cover in the pan storage space for preventing inadvertent removal of the cover from the pan storage space. In particular, the holders 58 inhibit the cover 30 from moving in either the forward or rearward direction with the pan 12 as the pan is inserted or removed from the pan storage space 22. As a pan 12 is inserted or removed from the pan storage space 22, the pan engages and tends to drag the cover 30 in the same direction the pan is moving in. To inhibit the cover 30 from being dragged with the pan 12, the retainer flange 62 (e.g., retainer surface) engages the cover, thereby preventing the cover from moving with the pan. For example, if the pan 12 is moving in a forward direction, the rear retainer surfaces of the holders 58 engage the edges of the openings 38 (broadly, cover retainer surfaces) to inhibit the cover 30 from moving in the forward direction. Similarly, if the pan 12 is moving in a rearward direction, the forward retainer surfaces of the holders 58 engage the edges of the openings 38 to inhibit the cover 30 from moving in the rearward direction. The cover supports 50 (e.g., holders 58) are immovable or fixed in position with respect to the housing 20.

To store the pan 12 in the pan storage space 22, the pan can be inserted into the pan storage space by moving the pan through the front or rear opening (e.g., the lower portion thereof) and sliding it along the pan support surface. As the pan 12 is received in the pan storage space 22, the pan lifts the cover 30 upward such that the cover becomes supported by and rests on the rim 14F of the pan, thereby covering the open top of the pan. In this position, the cover 30 is spaced above and out of engagement with the cover support surfaces of the cover supports 50. The cover support surfaces of the holders 58 are located with respect to the pan support surface so that the height of the pan 12 is greater than the vertical distance between the cover support surfaces and the pan support surface so the pan lifts the cover 30 off the cover support surfaces. Desirably, when the pan 12 reaches its stowed position in the pan storage space 22, the cover 30 covers the open top of the pan and substantially seals around the rim 14F. In the illustrated embodiment, the cover 30 is biased against the rim 14F by gravity only, but biasing devices such as springs, clamps, etc. may be used without departing from the scope of the present disclosure. As shown in FIG. 8, when the pan 12 supports the cover 30 off the cover support surfaces, the retainer surfaces of the holder 58 are still in horizontal registration with the edges of the opening 38 (i.e., the cover is still in the retained position) for retaining the cover in the pan storage space 22.

When it is desired to move the pan 12 from its stowed position in the pan storage space 22 to supply food (broadly, contents) to or remove food from the pan, the pan can be slid at least partially out of the pan storage space by grasping the handle 18 and sliding the pan forward or rearward. The front or rear end of the open top of the pan 12 becomes uncovered as the pan is pulled forward or rearward, exposing the contents in the pan. The cover 30 may ride forward or rearward on the pan 12 until the retainers 62 engage the cover for stopping forward or rearward movement of the cover. Accordingly, the retainers 62 retain the cover 30 in the pan storage space 22. If the pan 12 is entirely removed from the pan storage space 22, the upper flanges 36 of the cover 30 will come to rest in flatwise engagement with the cover support surfaces of the cover supports 50.

Referring back to FIGS. 1 and 2, the pan holding apparatus 10 may also include secondary retainers 64. The secondary retainers 64 are configured to retain the covers 30 in the pan storage space 22 when the pan 12 moves in the pan storage space and the primary retainers 62 fail to retain the cover in the pan storage space. As mentioned above, the retainers 62 may be considered primary retainers and are configured to retain the covers 30 in the pan storage space 22. However, if the primary retainers 62 fail to retain the cover 30 in the pan storage space, as explained in more detail below, the secondary retainers 64 retain the cover. As shown in the figures, the primary and secondary retainers 62, 64 have different configurations or constructions. The secondary retainer 64 is disposed outside the pan storage space 22. In particular, the pan storage apparatus 10 includes secondary retainers 64 disposed forward of the front opening and secondary retainers disposed rearward of the rear opening. The secondary retainer includes a flange or flap 66 connected to the upper wall assembly 26 of the housing 20. The flap 66 extends downward, over a portion of the front or rear opening. Specifically, the flap 66 blocks or covers a portion of the front or rear openings (e.g., a portion of the upper portion) to retain the cover 30. In this retaining position, the flap 66 is in horizontal registration with the cover 30 so that the cover will contact the flap if the cover moves in the forward or rearward direction and the primary retainers 62 fail to retain the cover. The flap 66 is movably or rotatably connected to the housing 20 with a fastener (e.g., a bolt). The flap 66 can rotate about the fastener. This allows the flap 66 to be rotated generally upward into a non-retaining position where the flap does not block the front or rear opening and are not in horizontal registration with the covers 30 to permit the covers to be inserted into and removed from the pan storage space 22. The flap 66 is sized, shaped and positioned to not be in horizontal registration with the pan 12 when the pan is in the pan storage space 22, thereby permitting the pan to be inserted into and removed from the pan storage space. The secondary retainers 64 may be configured to retain two or more covers 30. For example, in the illustrated embodiment, the secondary retainers 64 are generally disposed between adjacent cover supports 50, each supporting a different cover 30, so that the one secondary retainer can retain both the covers (e.g., the one secondary retainer is in horizontal registration with the two covers). However, it is understood that when the covers 30 are rearranged, as described in more detail below, the secondary retainers 64 may only be disposed to retain one cover.

The secondary retainers 64 retain the covers 30 when the primary retainers 62 fail to do so. The primary retainers 62 may fail to retain the cover 30 if the cover is lifted (e.g., lifted too high) as the pan 12 moves in the pan storage space 22 such that the primary retainers 62 (e.g., retainer surfaces) are no longer in horizontal registration with the cover (e.g., the edges of the openings 38). In this position, the cover 30 will move with the pan 12 until the cover engages the secondary retainer 64. As mentioned above, the covers 30 are configured to be slightly lifted by the pan 12 in order to rest on the rim 14F of the pan and cover the open top. This designed lifting of the cover 30 is not enough to move the cover out of horizontal registration with the primary retainers 62. However, if the cover 30 is further lifted (e.g., inadvertently moved upward), the cover may no longer be in horizontal registration with the primary retainers 62 and, accordingly, the primary retainers will fail to retain the cover. For example, the cover 30 may be inadvertently lifted if the pan 12 is not disposed generally horizontally but instead at an angle (e.g., 20 degrees) to the horizontal when the pan moves in the pan storage space 22. If the pan 12 is angled, an end of the pan may further lift the cover 30, thereby disengaging the cover from the primary retainers 62. In one example, an operator may impart an angle to the pan 12 relative to the horizontal by rotating the front end of the pan downward about a front edge of the pan support surface. This rotation may be involuntary and simply a result of the pan 12 being in a raised position relative to the operator (e.g., the operator has to access the pan by reaching up, sliding the pan outward and moving the pan downward) and the weight of the food in the pan. This rotation causes the rear end of the pan 12 to move upward, lifting the cover 30. If the rear end of the pan 12 lifts the cover 30 too far upward, the cover may disengage from some or all of the primary retainers 62. Thus, the primary retainers 62 will no longer be able to retain the cover 30 and the cover will generally move with the pan 12 until the pan engages the secondary retainer. It will be appreciated that, desirably, the secondary retainer 64 is located with respect to the holders 58 such that the cover 30 does not engage the secondary retainer unless the cover is not retained by the holders. In other words, in most circumstances, when the pan 12 is pulled forward, the cover 30 will engage the retainers 62, which will stop forward movement of the cover before engaging the secondary retainer 64, which prevents wear on the secondary retainer.

The secondary retainer 64 is desirably configured to position the cover 30 to reengage the primary retainer 58 when the secondary retainer retains the cover in the pan storage space 22. Specifically, the primary and secondary retainers 62, 64 are configured to have the cover 30 return to the retained position on the primary retainers after the cover is retained by the secondary retainer. The secondary retainers 64 are configured to be closely adjacent to the cover 30 when the covers are in the retained position. As mentioned above and shown in FIG. 6, the upper portions of the retaining surfaces of the retainer flange 62 are curved. Desirably, the distance between the flap 66 and the cover 30 when the cover is in the retained position is less than the radius of curvature of the curved portion of the retaining surfaces. In this manner, the edges of the openings 38 of the cover 30 will be positioned above the curved portions of the retaining surfaces when the cover engages the secondary retainer 64. Accordingly, when the secondary retainer 64 engages or retains the cover 30, the cover is positioned to reengage the primary retainers 62. After the pan 12 stops lifting the cover 30, the cover falls downward with the edges of the openings 38 engaging and sliding along the curved portions of the retaining surfaces to guide the cover back into the retained position.

During some methods of operation, only a portion of the primary retainers 62 may fail to retain the cover 30 if the cover is lifted (e.g., lifted too high) as the pan 12 moves into and/or out of the pan storage space 22 such that only some of the primary retainers (e.g., retainer surfaces) are no longer in horizontal registration with the cover (e.g., the edges of the openings 38). For example, the leading edge of the pan 12 may lift the cover 30 off of the leading or front cover supports 50 while the trailing or rear cover supports remain engaged with the cover. In this method of operation, the trailing cover supports 50 retain the cover 30, such that the secondary retainers 64 are not utilized in this operation situation.

Figure 10:
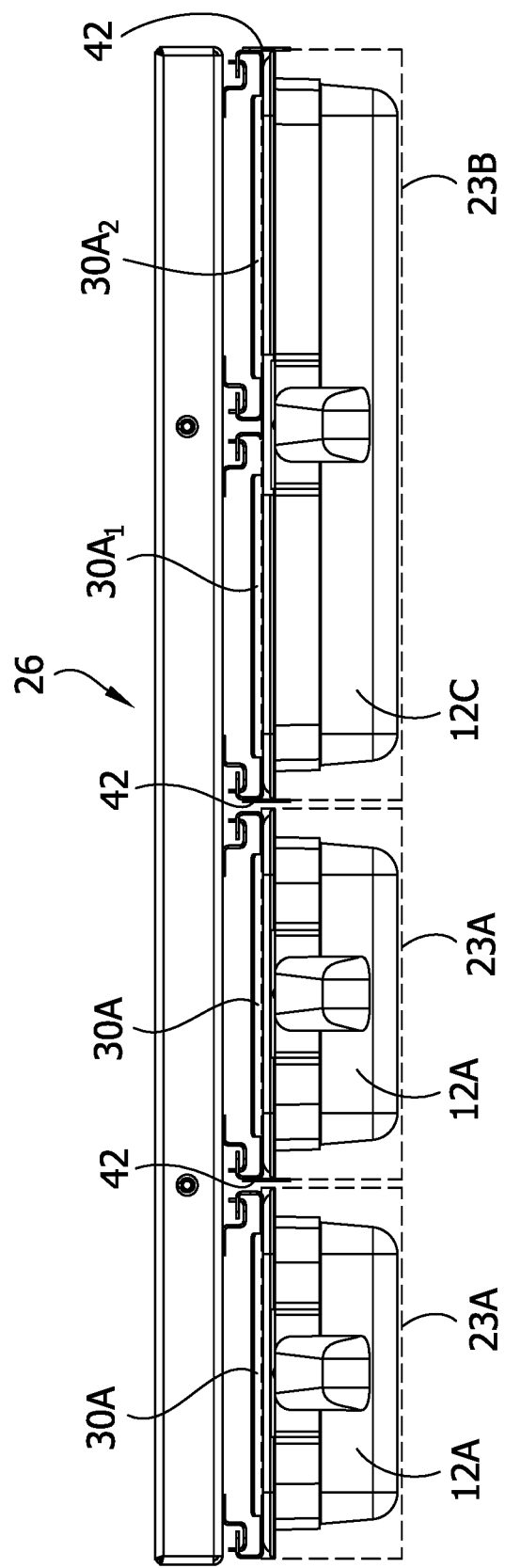
FIG. 10 is a front view of the upper wall assembly supporting the covers in another arrangement to cover pans of different sizes.

Referring to FIGS. 9 and 10, the dividers 42 of the covers divide the pan receiving space 22 into pan subspaces 23. Each pan subspace 23 is sized and shaped to receive (e.g., hold) one of the pans 12 therein. The pan subspaces 23 are sections of the pan storage space 22. The pan subspaces 23 are generally bounded by the covers (e.g., underlie the covers), the pan support surface and/or the side wall of the housing 20. A lower end of the pan subspace 23 is defined by the pan support surface and an upper end of the pan subspace is defined by one or more covers 30. The opposite sides of the pan subspace 23 may be defined by two dividers 42 or a divider and a side wall of the housing 20 (FIG. 9).

Figure 11:
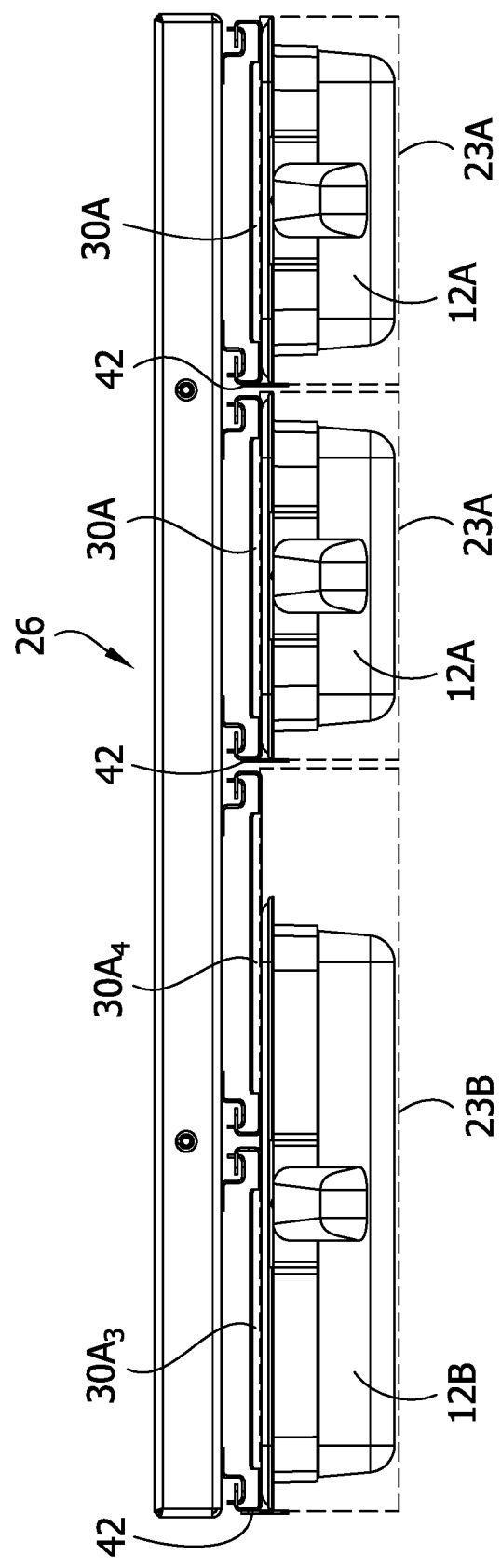
FIG. 11 is a front view of the upper wall assembly supporting the covers in another arrangement to cover pans of different sizes.

As with the covers 30 and the pans 12, the pan subspaces 23 of the pan holding apparatus 10 can have different sizes and shapes to receive pans of different sizes. For example, the pan subspaces 23 shown in FIG. 9 are ⅓ size pan subspaces 23A (e.g., a first pan subspace size) sized and shaped to receive a ⅓ size pan 12A. As explained in more detail below, the pan storage apparatus 10 can be configured to have pan subspaces 23 of other sizes (e.g., a first pan subspace size, a second pan subspace size, a third pan subspace size, etc.). For example, the pan storage apparatus 10 can have ⅔ size pan subspaces 23B (e.g., a second pan subspace size), full size pan subspace 23C (e.g., a third cover size), etc. A full pan subspace 23C and ⅔ size pan subspace 23B are shown in FIGS. 10-14. Generally, the ⅔ size pan subspace 23B is sized and shaped to receive a ⅔ size pan 12C and a full size pan subspace 23C is sized and shaped to cover a full size pan 12D. However, it is understood that larger pan subspaces 30 can be used to receive smaller pans 12. For example, a ⅔ size pan subspace 23B can be used to receive a ½ size pan 12B, as shown in FIG. 11. As with the pans 12 and covers 30, the fraction portion (e.g., ⅓) of the cover size type indicates the size of the pan subspace 30 in relation to a full size pan subspace 23C and therefore the corresponding size (e.g., maximum size) of the pan the pan subspace is configured to receive. The pan subspaces 23A-C all have generally the same configuration or construction, just different sizes (e.g., different widths). As used herein, the reference numeral "23" refers to all sizes of pan subspaces (e.g., pan subspaces 23A-C) for use with the pan storage apparatus 10 and the reference numeral "23" followed by a letter, such as "A," refers to a particular size of pan subspace, such as a ⅓ size pan subspace.

The pan holding apparatus 10 is configurable and reconfigurable to hold pans 12 of generally any size (e.g., ⅓ size pans 12A, ½ size pans 12B, ⅔ size pans 12C, full size pans 12D, etc.). In particular, the covers 30 of the pan holding apparatus 10 are arrangeable and rearrangeable to configure the pan holding apparatus to hold generally any combination of pans 12 (e.g., different size pans 12A-D). In the illustrated embodiment, a ⅘ size pan (not shown) is the maximum size pan 12 that the pan storage space 22 is sized to hold, although other sizes (e.g., larger or smaller) of the pan storage space are within the scope of the present disclosure. Desirably, the pan storage space 22 is sized based on a multiple of a ⅓ size pan 12A. As will become apparent, this sizing of the pan storage space 22 enables the pan holding apparatus 10 to be quickly configured to hold a wide variety of different sizes and arrangements of pans 12. Overall, the size and arrangement of pans 12 that are held by the pan holding apparatus 10 is determined by the size and arrangement of the covers 30 in the pan storage space 22. The configurability of the pan holding apparatus 10 is accomplished in several ways. First, each cover 30 is configured to be coupled to the housing 12 in different orientations (e.g., at least two orientations), thereby changing the position of the divider 42 of the cover in the pan receiving space 22. Second, the covers 30 can be coupled to the housing 20 in different arrangements or orders, thereby also changing the positions of the dividers 42 in the pan receiving space 22. Third, different size covers 30 can be coupled to the housing 20. All three of these different methods can be used to configure the pan holding apparatus 10 to hold pans 12 of different sizes as desired.

Referring to FIGS. 9 and 10, the covers 30 of the illustrated embodiment are configured to be coupled to the housing in two different (e.g., first and second) orientations, a left orientation and a right orientation. In the left orientation, the cover 30 is oriented such that the divider 42 is on the left side of the cover. For example, the right three covers 30 in FIG. 9 are all shown in the left orientation. In the right orientation, the cover 30 is oriented such that the divider 42 is on the right of the cover. For example, the right-most cover 30 in FIG. 10 is shown in the right orientation. A cover 30 in the right orientation is turned around or rotated approximately 180 degrees about a vertical axis (not shown) relative to a cover in the left orientation. Rotating the cover 30 positions the divider 42 on either the left or right side of the cover. As shown in FIGS. 9 and 10, the size of the pan subspace 23 (and therefore the size of the pan 12 that can be held therein) can be selected as desired by choosing the orientation in which the covers 30 are coupled to the cover supports 50 of the housing 20. The orientation of the covers 30 determines the position of the dividers 42 in the pan storage space 22 and therefore the size of the pan subspace (s) 23 defined by the dividers.

The covers 30 can be oriented to change the configuration of the pan subspaces 23 in the pan storage space 22 and thereby the sizes of pans 12 that can be received in the pan storage space. The covers 30 can be oriented in one (e.g., a first) cover arrangement (e.g., orientation arrangement) such that the dividers 42 divide the pan storage space 22 into one (e.g., a first) pan subspace 23 configuration. The covers 30 can also be oriented in another (e.g., a second) cover arrangement such that the dividers 42 divide the pan storage space 22 into another (e.g., a second) pan subspace 23 configuration. In the second cover arrangement, at least one of the covers 30A has been rotated approximately 180 degrees to change the orientation of the cover. For simplicity, these different cover arrangements will be described in context of two covers 30 with the understanding these teachings are applicable to all covers. For example, as shown in FIGS. 9 and 10, the pan holding apparatus 10 includes four ⅓ size covers 30A. Three of these ⅓ size covers 30A include dividers 42 and the other does not. The three ⅓ size covers 30A with dividers 42 are identical. In FIG. 9, two covers $30A_1$, $30A_2$ are arranged in the pan storage space 22 in a first cover arrangement such that the dividers 42 of these covers divide the pan storage space into one (e.g., a first) pan subspace $23A_1$ sized to receive one (e.g., a first) pan 12 and a second pan subspace $23A_2$ sized to receive another (e.g., a second) pan. In this embodiment, the two pans are ⅓ size pans 12A. As used herein, subscripts are used to identify separate elements of the same element type (e.g., a first ⅓ size cover and a ⅓ size second cover of the ⅓ size covers). In FIG. 10, the two covers $30A_1$, $30A_2$ are arranged in the pan storage space 22 in a second cover arrangement. In this second cover arrangement, the dividers 42 of these two covers $30A_1$, $30A_2$ divide the pan storage space 22 into third pan subspace 23B size to receive another (e.g., a third) pan 12. This pan 12 can be of a different size than the pans (broadly, at least one of the pans) received when the covers are in the first cover arrangement. In this embodiment, the third pan subspace 23B can receive up to a ⅔ size pan 12C.

In operation, to change the pan subspace 23 configuration, the operator rearranges (e.g., re-orients) the two covers $30A_1$, $30A_2$ (broadly, at least one cover) positioned in the first orientation in the pan receiving space 22 as shown in FIG. 9 to the orientations shown in FIG. 10. In this embodiment, the operator rearranges the second cover $30A_2$ in the second orientation. The operator removes the second cover $30A_2$ from the cover supports 50 and the pan storage space 22, turns or rotates the second cover approximately 180 degrees and then reinserts the second cover into the pan storage space and attaches to the second cover to same cover supports the cover was initial suspended from. This process moves the divider 42 on the second cover $30A_2$ from the left side (FIG. 9) to the right side (FIG. 10), thereby changing the size (e.g., width) of the pans subspace 23 defined between the dividers of the first and second covers $30A_1$, $30A_2$. In other embodiments, two or more (e.g., both the first and second covers $30A_1$, $30A_2$) of the covers 30 may be rearranged in another orientation to change the configuration of the pan subspaces 23 in the pan storage space 22.

Referring to FIGS. 9 and 11, the covers 30 can be rearranged (e.g., reorder) in other ways to change the configuration of the pan subspaces 23 in the pan storage space 22 and thereby the sizes of pans 12 that can be received in the pan storage space. Specifically, the covers 30 with and without dividers 42 can be rearranged to change the configuration of the pan holding apparatus 10. The covers 30 can be ordered in one (e.g., a first) cover arrangement (e.g., order arrangement) such that the dividers 42 divide the pan storage space 22 into one (e.g., a first) pan subspace 23 configuration. The covers 30 can also be ordered in another (e.g., a second) cover arrangement such that the dividers 42 divide the pan storage space 22 into another (e.g., a second) pan subspace 23 configuration. Specifically, the at least some of the covers 30 are reordered or repositioned such that they are being supported by different cover supports 50 in the pan storage space 22 in the second cover arrangement compared to the first cover arrangement. For simplicity, these different cover arrangements will again be described in context of two covers 30 with the understanding these teachings are applicable to all covers. For example, as shown in FIGS. 9 and 11, the pan holding apparatus 10 includes four ⅓ size covers 30A. Three of these ⅓ size covers 30A include a divider 42 and the other does not. Specifically, the pan holding apparatus 10 includes one ⅓ size cover $30A_3$ with a divider 42 and one ⅓ size cover $30A_4$ without a divider. Other configurations are within the scope of the present disclosure. For example, the pan holding apparatus 10 can includes two ⅓ size covers 30A with dividers 42 and two covers without dividers. In FIG. 9, the two covers $30A_3$, $30A_4$ are arranged in the pan storage space 22 in a first cover arrangement such that the divider 42 of the first cover $30A_3$ divides the pan storage space into one (e.g., a first) pan subspace $23A_3$ size to receive one (e.g., a first) pan 12 and a second pan subspace $23A_4$ sized to receive another (e.g., a second) pan. In this embodiment, the two pans are ⅓ size pans 12A. In this arrangement, the divider 42 is disposed generally between the two covers $30A_3$, $30A_4$, thereby dividing the pan storage space 22 underlying the two covers forming two ⅓ size pan subspaces 23A. In FIG. 11, the two covers $30A_3$, $30A_4$ are arranged (e.g., ordered) in the pan storage space 22 in a second cover arrangement. In this second cover arrangement, the divider 42 of the first cover $30A_3$ divides the pan storage space 22 into third pan subspace 23B size to receive another (e.g., a third) pan 12. This pan 12 can be of a different size than the pans (broadly, at least one of the pans) received when the covers are in the first cover arrangement. In this embodiment, the third pan subspace 23B can receive up to a ⅔ size pan 12C, with a ½ size pan 12B shown in the illustrated embodiment. In this arrangement, the divider 42 is not disposed between the two covers $30A_3$, $30A_4$, thereby enabling both covers to define a single pan subspace 23 and cooperate with each other to cover a pan 12 received in the pan subspace (e.g., each cover covers a portion of the pan).

In operation, to change the pan subspace 23 configuration, the operator rearranges (e.g., reorders) the two covers $30A_3$, $30A_4$ (broadly, at least two covers) positioned in the first order in the pan receiving space 22 as shown in FIG. 9 to the order shown in FIG. 11. In this embodiment, the operator changes (e.g., switches) the positions of the two covers $30A_3$, $30A_4$ in the pan receiving space 22. The operator removes the first and second covers $30A_3$, $30A_4$ from their respective cover supports 50 shown in FIG. 9 and the pan storage space 22. The operator than switches the first and second covers $30A_3$, $30A_4$ around and reinserts the covers into the pans storage space 22. The first cover $30A_3$ is attached to the cover supports 50 previously supporting the second cover $30A_4$ and the second cover is attached to the cover supports 50 previously supporting the first cover. This process moves the divider 42 on the first cover $30A_3$ away from the second cover $30A_4$, thereby enabling the two covers to cooperate to define one pan subspace 23 and cover a larger pan 12. In other embodiments, three or more of the covers 30 may be rearranged in another order to change the configuration of the pan subspaces 23 in the pan storage space 22. As used herein, the term "arrange" and other terms within the arrange word family (e.g., arrangement) may refer to the orientation and/or order of the covers 30.

Figure 12:
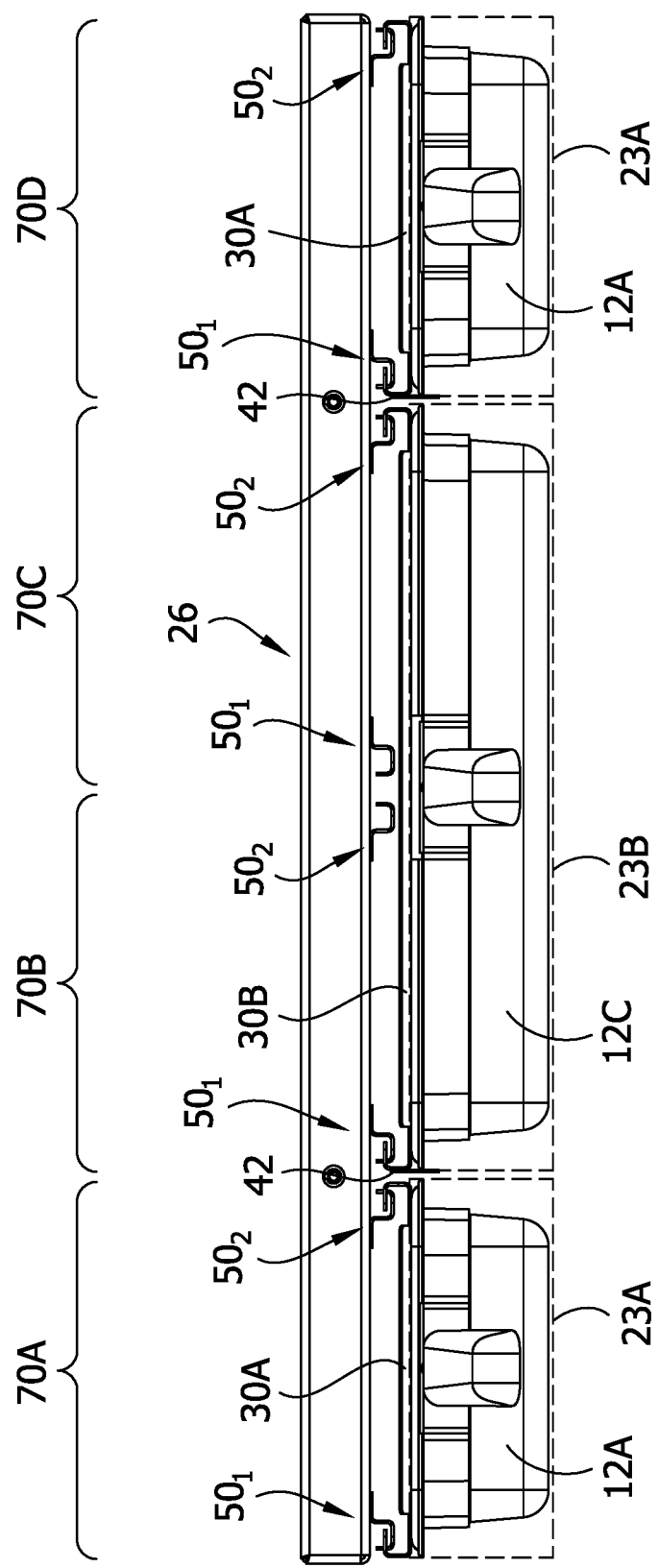
FIG. 12 is a front view of the upper wall assembly supporting different size covers in an arrangement to cover pans of different sizes.
Figure 13:
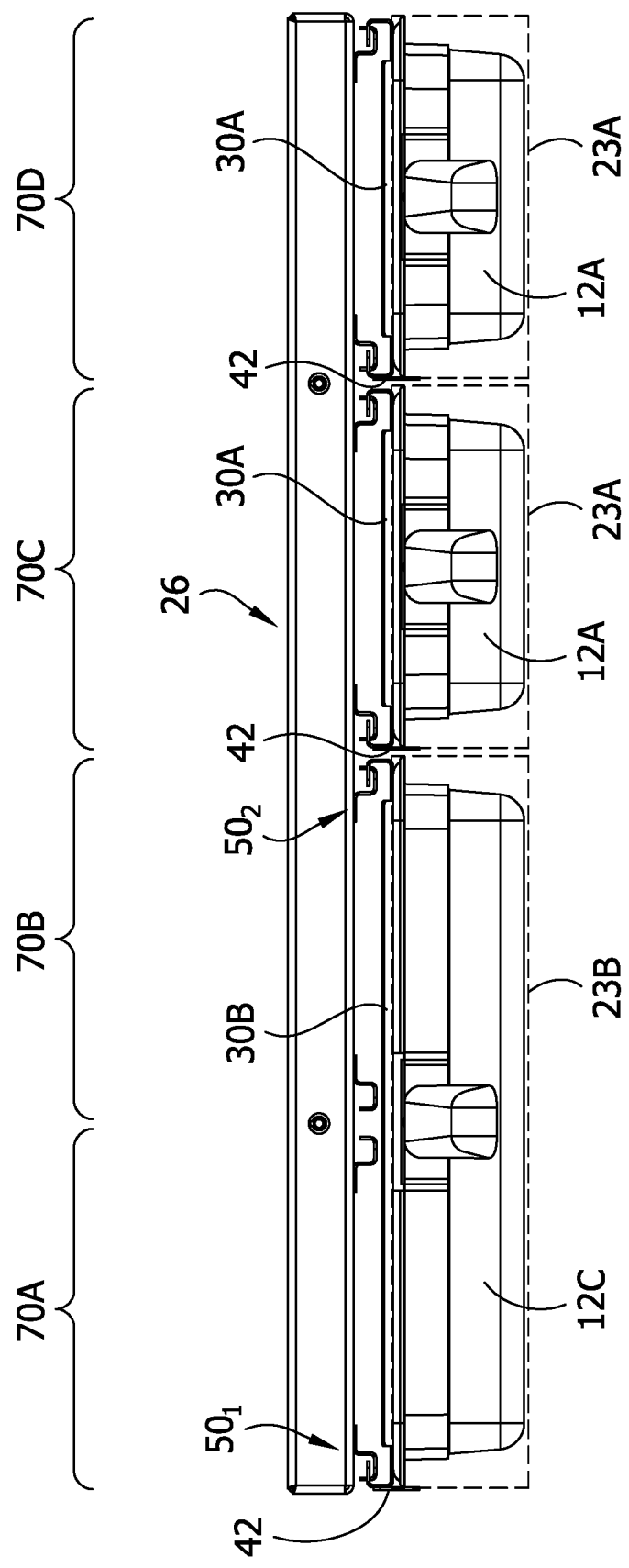
FIG. 13 is a front view of the upper wall assembly supporting different size covers in another arrangement to cover pans of different sizes.
Figure 14:
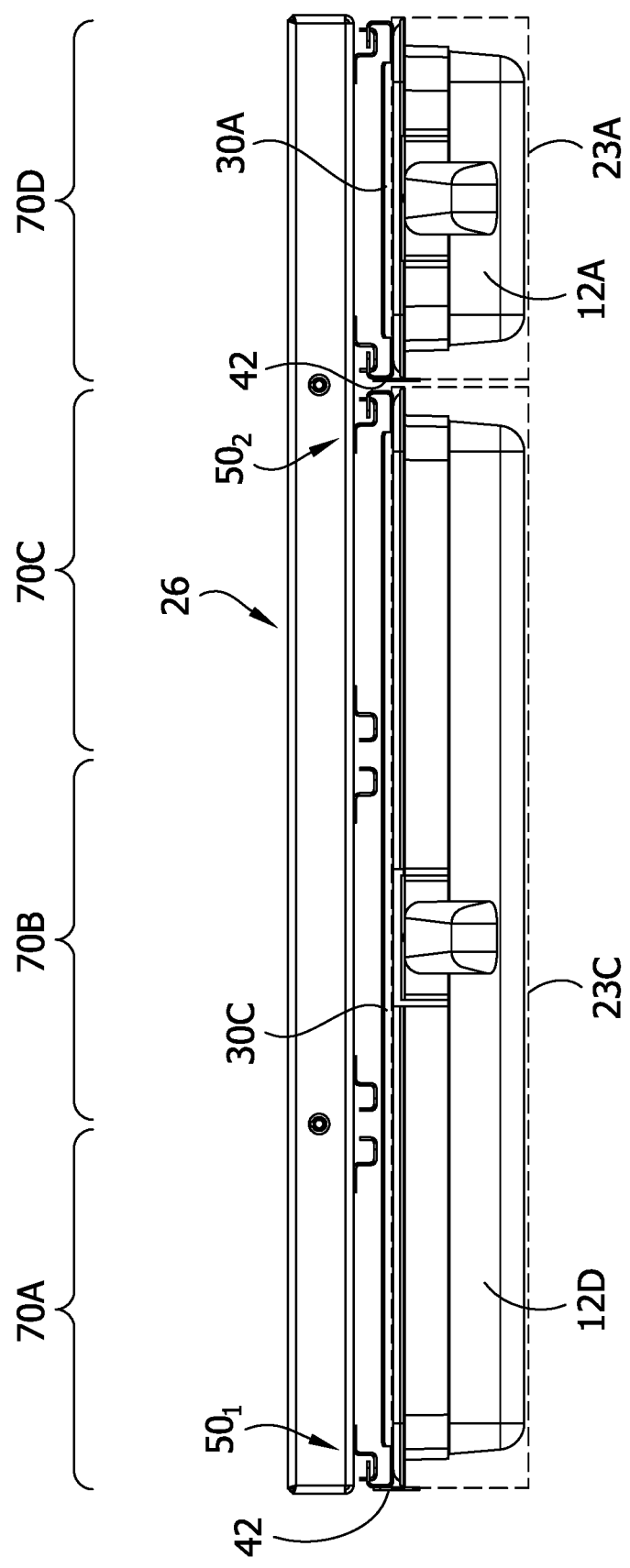
FIG. 14 is a front view of the upper wall assembly supporting different size covers in another arrangement to cover pans of different sizes.

Referring to FIGS. 12-14, the pan holding apparatus 10 can include a variety of different size covers 30 to cover different size pans 12 in the pan storage space 22. Specifically, covers 30 of different sizes can be attached to the cover supports 50 to change the configuration of the pan subspaces 23 in the pan storage space 22 and thereby the size of pans 12 that can be received in the pan storage space. In the illustrated embodiment, the pan holding apparatus 10 is shown including ⅓ size covers 30A, ⅔ size covers 30B and full size covers 30C.

The cover supports 50 are configured to enable covers 30 of different sizes (e.g., 30A, 30B, 30C) to be attached to the housing 20 and to be disposed (e.g., suspended) in the pan storage space 22. The cover supports 50 are arranged in cover support sets or pairs 70. In the illustrated embodiment, the pan holding apparatus includes four cover support sets 70A-D, although more or fewer are within the scope of the present disclosure. Each cover support set 70 includes two (e.g., first and second, left and right) cover supports 50. As mentioned above, two cover supports 50 are used to support a cover 30 (e.g., the left and right sides of a cover) in the pan storage space 22. As explained in more detail below, the two cover supports 50 supporting the cover can be part of the same cover support set 70 or different cover support sets. Each cover support set 70 is configured to support the smallest size of cover 30 to be used with the pan holding apparatus 10. In the illustrated embodiment, the smallest size of cover 30 and pan 12 are the ⅓ size cover 30A and ⅓ size pan 12A, although other sizes are within the scope of the present disclosure. As used herein, the reference numeral "70" refers to all the cover support sets (e.g., sets 70A-D) of the pan storage apparatus 10 and the reference numeral "70" followed by a letter, such as "A," refers to a particular cover support set.

The cover supports 50 (e.g., cover support sets 70) are configured to support covers 30 of different sizes. For example, one cover support 50 may be used to support covers 30 of various different sizes. The cover support sets 70 are positioned on the housing 20 to cooperate with one another to support covers 30 of larger sizes. In particular, the cover support sets 70 and cover supports 50 are positioned on the housing 20 so that the first or left cover support $50_1$ of one cover support set 70 can be used with the second or right cover support $50_2$ of the same cover support set to support a first size of cover 30 (e.g., ⅓ size cover 30A) or can be used with the second cover support $50_2$ of a different cover support set to support a second size of cover (e.g., a ⅔ size cover 30B). The two (e.g., left and right) cover supports $50_1$, $50_2$ used to support one cover 30 form a cover support group. It is understood that a cover support set 70 can be a cover support group, or that a cover support 50 of one cover support set and another cover support of another cover support set may form a cover support group. Moreover, one cover support 50 can be used to form several different cover support groups depending on the other cover support used with it. The cover supports 50 can be a part of different cover support groups to support covers 30 of different sizes. The cover support sets 70 are also uniformly spaced apart, so that the distance between any two cover supports 50 is standardized or the same as the distance for other corresponding two cover supports. For example, the distance between the left cover support $50_1$ of the first cover support set 70A and the right cover support $50_2$ of the third cover support set 70C (e.g., a first cover support group) is the same as a distance between the left cover support $50_1$ of the second cover support set 70B and the right cover support $50_2$ of the fourth cover support set 70D (e.g., a second cover support group) and, thus, a full size cover 30C can be suspended from either one of these cover support groups. This uniform spacing of the cover supports 50 permits the interchangeability of the cover 30 sizes described herein.

The pan holding apparatus 10 is configured to hold (e.g., include) one or more of a first cover 30 (e.g., a ⅓ size cover 30A) having a size and shape to cover a first pan 12 (e.g., a ⅓ size pan 12A) of a first size, one or more of a second cover (e.g., a ⅔ size cover 30B) having a size and shape to cover a second pan 12 (e.g., a ⅔ size pan 12C) of a second size different than the first size, and/or one or more of a third cover (e.g., a full size cover 30C) having a size and shape to cover a third pan (e.g., a full size pan 12D) of a third size different than the first and second sizes. The first, second and third covers 30 all have different sizes. The cover supports 50 are configured to support the first, second and/or third covers 30 in the pan storage space 22. The cover supports 50 include a first cover support group configured to support the first cover 30 (e.g., a ⅓ size cover 30A), a second cover support group configured to support the second cover (e.g., a ⅔ size cover 30B), and a third cover support group configured to support the third cover (e.g., a full size cover 30C).

In the illustrated embodiment, the pan storage apparatus 10 is configured to hold covers 30 having sizes that are a multiple of the ⅓ size cover 30A (e.g., ⅔ size cover 30B). The cover supports 50 (e.g., cover support sets 70) are arranged (e.g., spaced apart) such that cover supports of generally adjacent cover support sets can be used to support covers 30 having a size that is a multiple of the ⅓ size cover 30A. To support a ⅔ size cover 30B, the left cover support $50_1$ of one cover support set 70 and a right cover support $50_2$ of an adjacent cover support set 70 are used (e.g., form a cover support group) to support the ⅔ size cover (FIGS. 12 and 13). For example, in FIG. 13 the left cover support $50_1$ of cover support set 70A and the right cover support $50_2$ of cover support set 70B form a cover support group used to support a ⅔ size cover 30B. To support a full size cover 30C, the left cover support $50_1$ of one cover support set 70 and a right cover support $50_2$ of another cover support set 70 spaced apart by a cover support set (e.g., there is a cover support set disposed therebetween) are used (e.g., form a cover support group) to support the full size cover (e.g., FIG. 14). For example, in FIG. 14, the left cover support $50_1$ of cover support set 70A and the right cover support $50_2$ of cover support set 70C form a cover support group used to support a full size cover 30C. Moreover, the at least some of the various different cover support groups (e.g., first and second cover support groups) can include one (broadly, at least one) of the same cover supports 50. For example, as shown in FIGS. 13 and 14, the left cover support $50_1$ of cover support set 70A forms one cover support group with the right cover support $50_2$ of cover support set 70B to support a ⅔ size cover 30B and forms another cover support group with right cover support $50_2$ of cover support set 70C to support a full size cover 30C.

Figure 15:
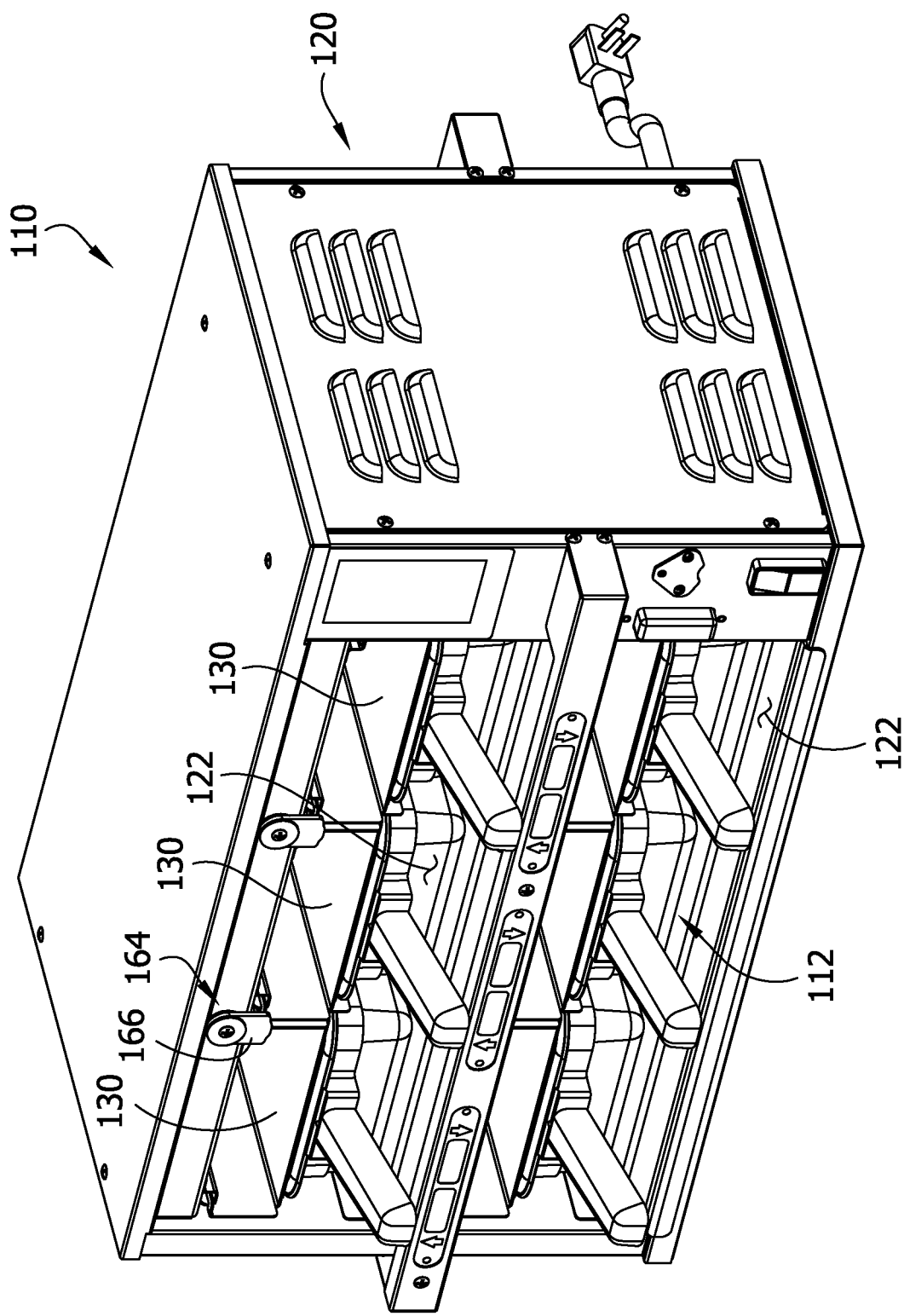
FIG. 15 is a perspective of a pan storage apparatus according to another embodiment of the present disclosure.
Figure 16:
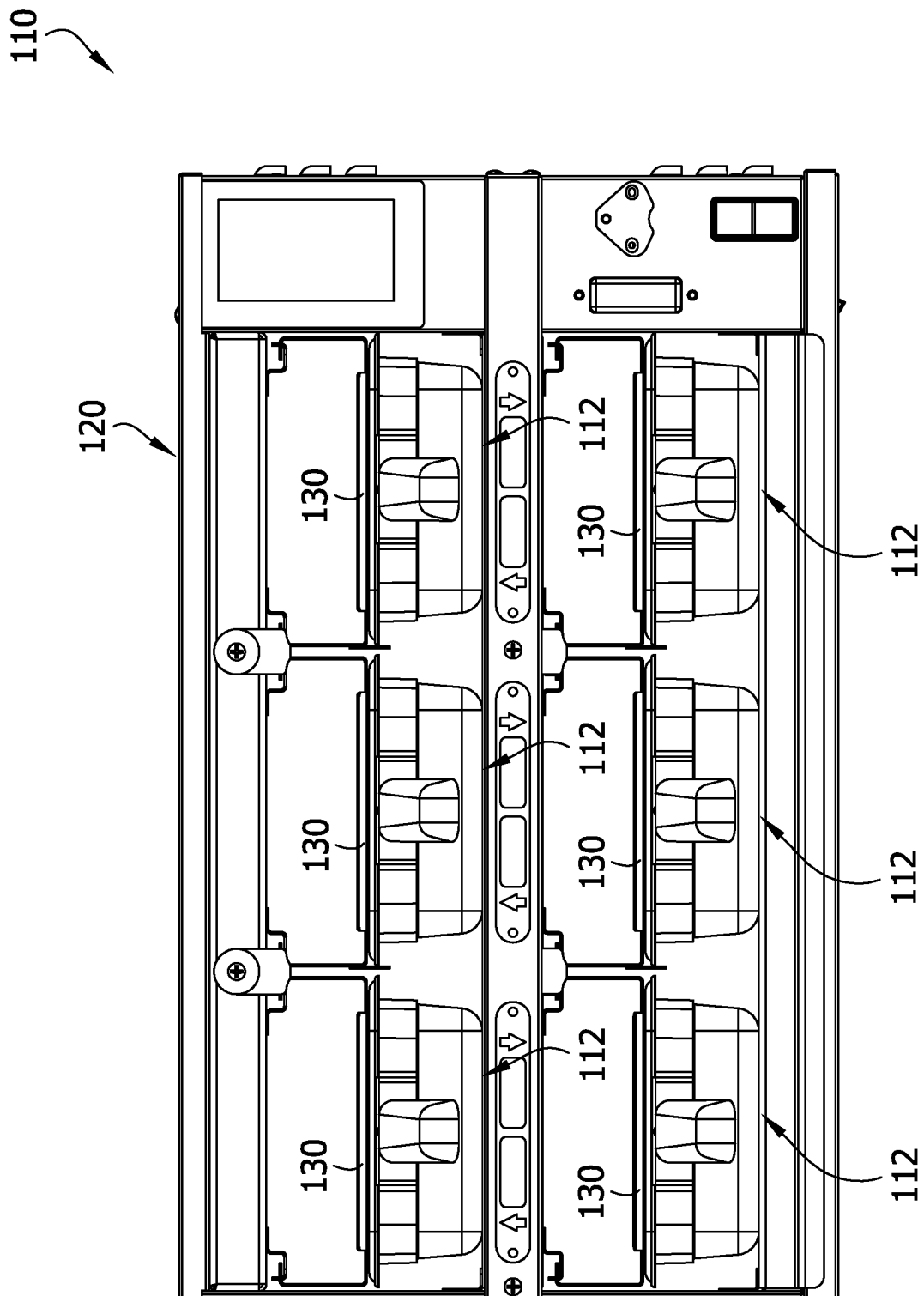
FIG. 16 is a front view of the pan storage apparatus of FIG. 15.

Desirably, the pan storage space 22 of the pan holding apparatus 10 is sized large enough to permit at least two different size covers to be supported in the pan storage space at the same time. This increases the versatility and configurability of the pan holding apparatus 10 to receive the sizes of pans 12 as desired. In the illustrated embodiment, the pan storage space 22 of the pan holding apparatus 10 is sized to receive a cumulative size total of 4/3 size covers 30 (e.g., 4/3 size pans 12). Thus, the pan storage space 22 can receive four ⅓ size covers 30A, two ⅓ size covers and a ⅔ size cover 30B, or a ⅓ size cover and a full size cover 30C. The different sizes of covers 30 can be rearranged (e.g., reoriented and/or reordered), as described above, to create generally any desired pan subspace 23 configuration to hold generally any desired pan 12 configuration. Other sizes (e.g., lengths) of the pan storage space of the pan holding apparatus are within the scope of the present disclosure. For example, the pan storage space can be sized to hold more or fewer pans (e.g., more or fewer than four ⅓ size pans 12A). Referring to FIGS. 15 and 16, in one example embodiment, a pan storage apparatus 110, described in more detail below, has a pan storage space 112 sized to receive a cumulative size total of a full size pan 12D (e.g., a full size cover 30C). In other words, the pan storage space 112 is sized to hold up to three ⅓ size pans 112A.

Referring back to FIGS. 12-14, in operation, to change the sizes of covers 30 in the pan storage space 22, and thereby the pan subspace 23 configuration, the operator changes out one or more of the covers in the pan storage space. The operator may remove one or more initial covers 30 of the same or different sizes from the cover supports 50 (e.g., cover support groups) supporting those covers and then insert a new cover of a different size in the pan storage space 22 and support the new cover using at least one (e.g., some) of the cover supports that were previously supporting the initial covers. For example, referring to FIGS. 9 and 12, the operator can add a ⅔ size cover 30B to the pan holding apparatus 10 (as shown in FIG. 12) by removing two adjacent ⅓ size covers $30A_1$, $30A_3$ from the pan holding apparatus (as shown in FIG. 9). In this example, the left cover support $50_1$ of cover support set 70B and the right cover support $50_2$ of cover support set 70C which were previously used to support the ⅓ size covers 30A (FIG. 9) are now being used (e.g., form a new cover support group) to support the ⅔ size cover 30B (FIG. 12). In another example, referring to FIGS. 13 and 14, the operator can add a full size cover 30C to the pan holding apparatus 10 (as shown in FIG. 14) by removing adjacent ⅓ size cover 30A and ⅔ size cover 30B from the pan holding apparatus (as shown in FIG. 13). In this example, the left cover support $50_1$ of cover support set 70A and the right cover support $50_2$ of cover support set 70C which were previously used to support the ⅓ and ⅔ size covers 30A, 30B (FIG. 13) are now being used (e.g., form a new cover support group) to support the full size cover 30C (FIG. 14). The operator can then further rearrange the covers 30 in the pan storage space 22 as desired. For example, the operator can reorient and/or reorder the covers 30, as described above.

As is now apparent, the pan holding apparatus 10 is configurable to hold generally any size of pan 12 in generally any order in the pan storage space 22. By selecting the cover 30 sizes supported in the pan storage space 22, the order of the covers, and/or the orientation of the covers (collectively and broadly, the cover arrangement or configuration) the operator can configure the pan storage space (e.g., pan subspaces 23) to receive the desired configuration (e.g., sizes and/or orders) of pans 12. FIGS. 9-14 illustrate several example configurations of the covers 30 for configuring the pan receiving space 22 to receive different configurations of pans 12. It is understood that the cover 30 configurations are not limited to those shown in FIGS. 9-14 and other cover configurations are within the scope of the present disclosure. Moreover, a person having ordinary skill in the art readily understands and/or can determine what cover 30 configurations are possible in view of the teachings herein (e.g., configuring the covers by changing the orientation, order, and/or sizes of the covers).

Figure 17:
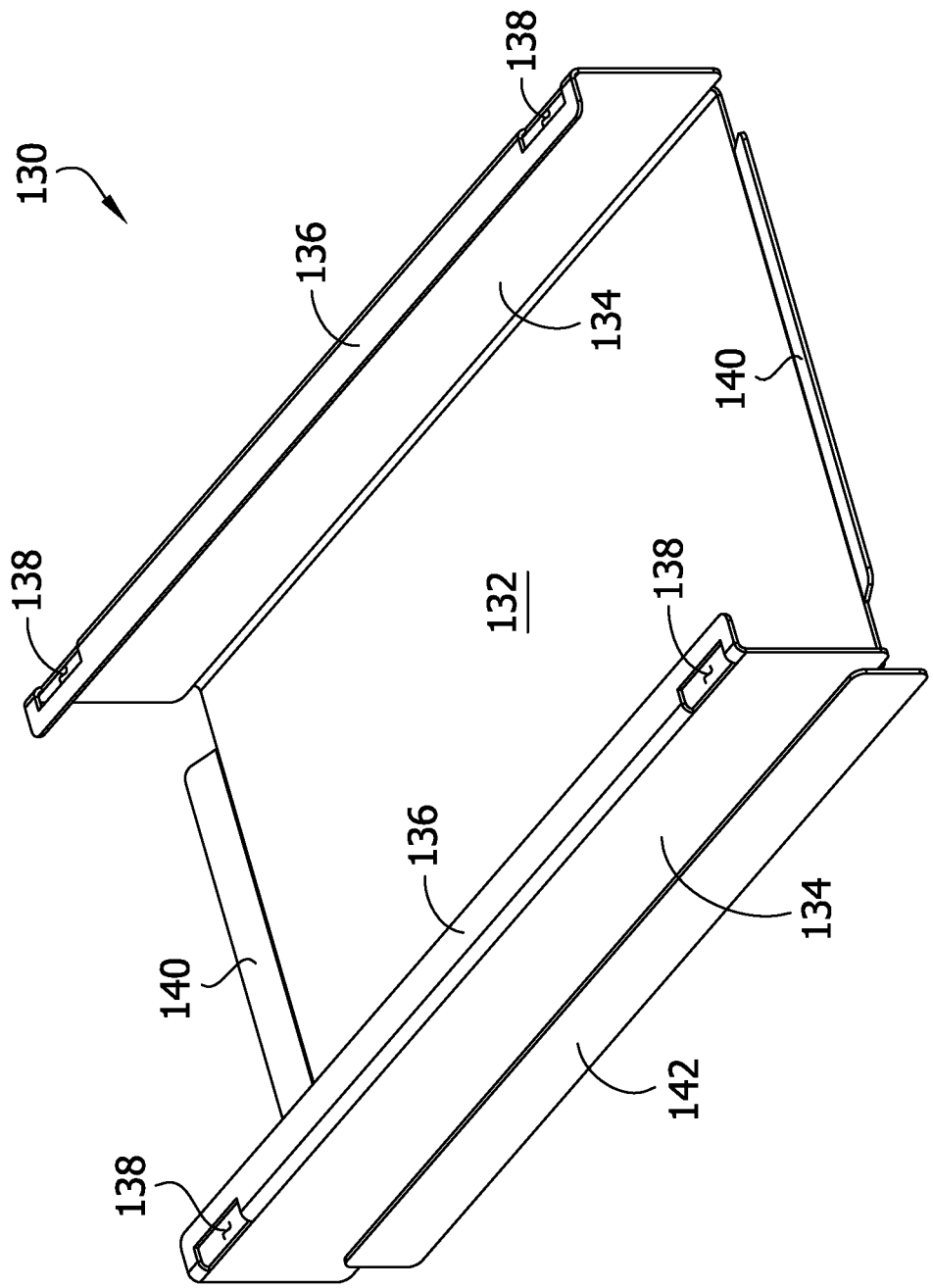
FIG. 17 is a perspective of a cover of the pan storage apparatus of FIG. 15.

Referring to FIGS. 15-17, another embodiment of a pan storage apparatus according to the present disclosure is generally indicated by the reference number 110. The pan storage apparatus 110 includes covers 130 for covering pans 112. Pan storage apparatus 110, covers 130, and pans 112 are generally analogous (have substantially the same construction) to pan storage apparatus 10, covers 30 and pans 12, respectively. Thus, for ease of comprehension, where similar, analogous, or identical parts are used, similar reference numerals, plus 100, are employed. Accordingly, unless clearly stated or indicated otherwise, the above descriptions regarding pan storage apparatus 10, covers 30, and pans 12 also apply to pan storage apparatus 110, covers 130 and pans 112.

Pan storage apparatus 110 is generally the same as pan storage apparatus 10 except that pan storage apparatus 110 includes different covers 130 for covering pans 112, and the apparatus is not as wide. Pans 112 are similar to pans 12, except that pans 112 have a smaller height. For example, the pans 112 may have a height of 2½ inches. To accommodate the smaller height of the pans 112, covers 130 have a height (e.g., a first height) that is taller than the height (e.g., a second height) of covers 30. In particular, the side flanges 134 of cover 130 are taller (e.g., have a taller height) than the side flanges 34 of cover 30. It is understood the side flanges 134 of cover 30 can be generally any height to accommodate the height of any pan. Covers 30 and covers 130 are interchangeable. In addition, both covers 30, 130 can be used (e.g., mounted to) the pan storage apparatus 10, 110 at the same time so that the pan storage apparatus can support pans 12, 112 of different heights (e.g., side-by-side) at the same time. Accordingly, by selecting covers 30, 130 of a particular height, the operator can further configure (in addition to selecting the cover sizes supported in the pan storage space 22, 122, the order of the covers, and/or the orientation of the covers, as described above) the cover arrangement (e.g., pan subspaces 23, 123) to receive the desired configuration (e.g., sizes and/or orders) of pans 12, 112. Multiple (e.g., two or more) covers 30, 130 of different heights and/or sizes (e.g., ⅓ size covers 30A, 130A, ⅔ size covers 30B, 130B, full size covers 30C, 130C, etc.) can from a cover kit of the pan storage apparatus 10, 110 and be provided with the pan storage apparatus to permit the operator to arrange the covers in multiple (e.g., all the) different cover arrangements.

Figure 18:
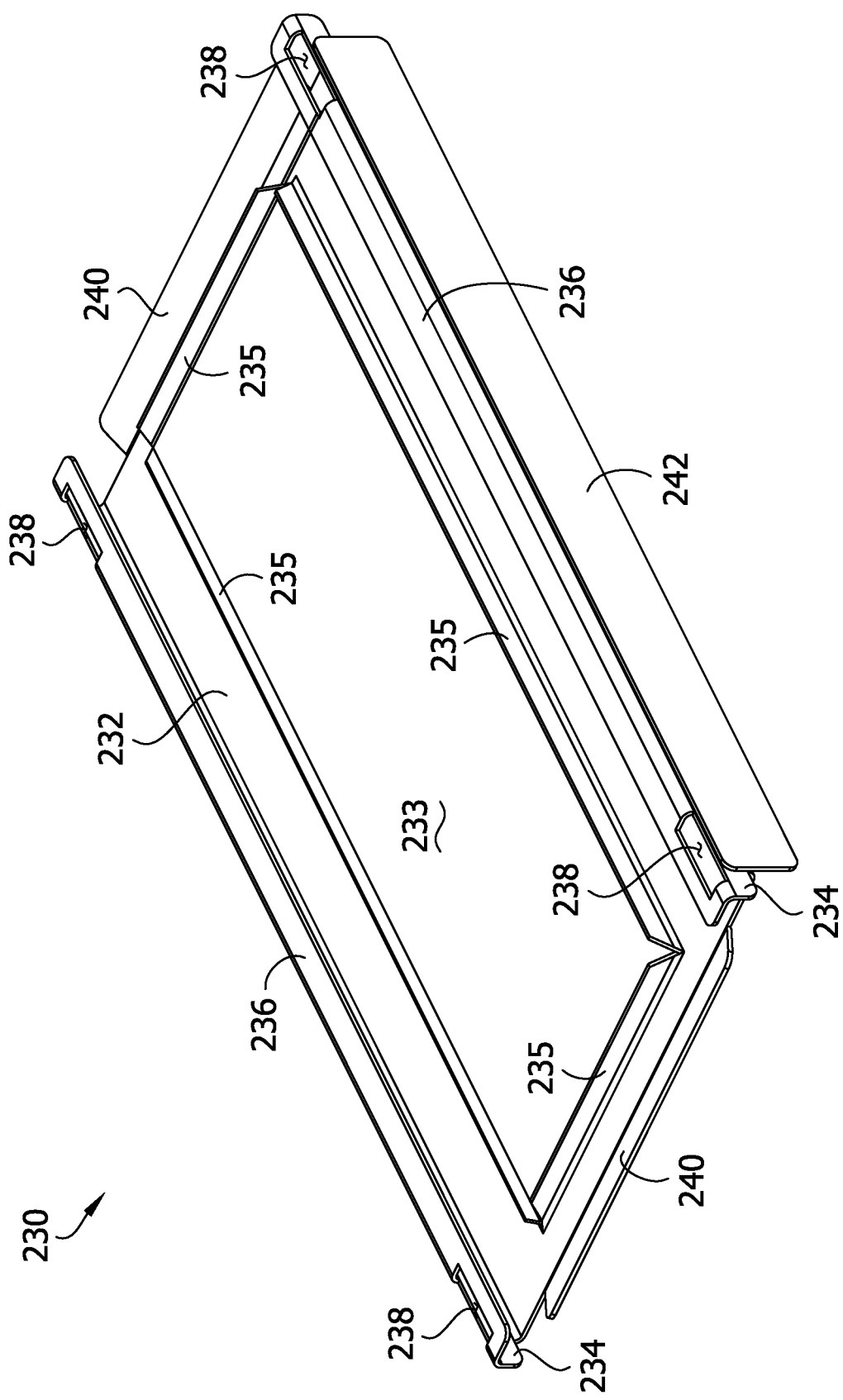
FIG. 18 is a perspective of a cover according to another embodiment of the present disclosure.
Figure 19:
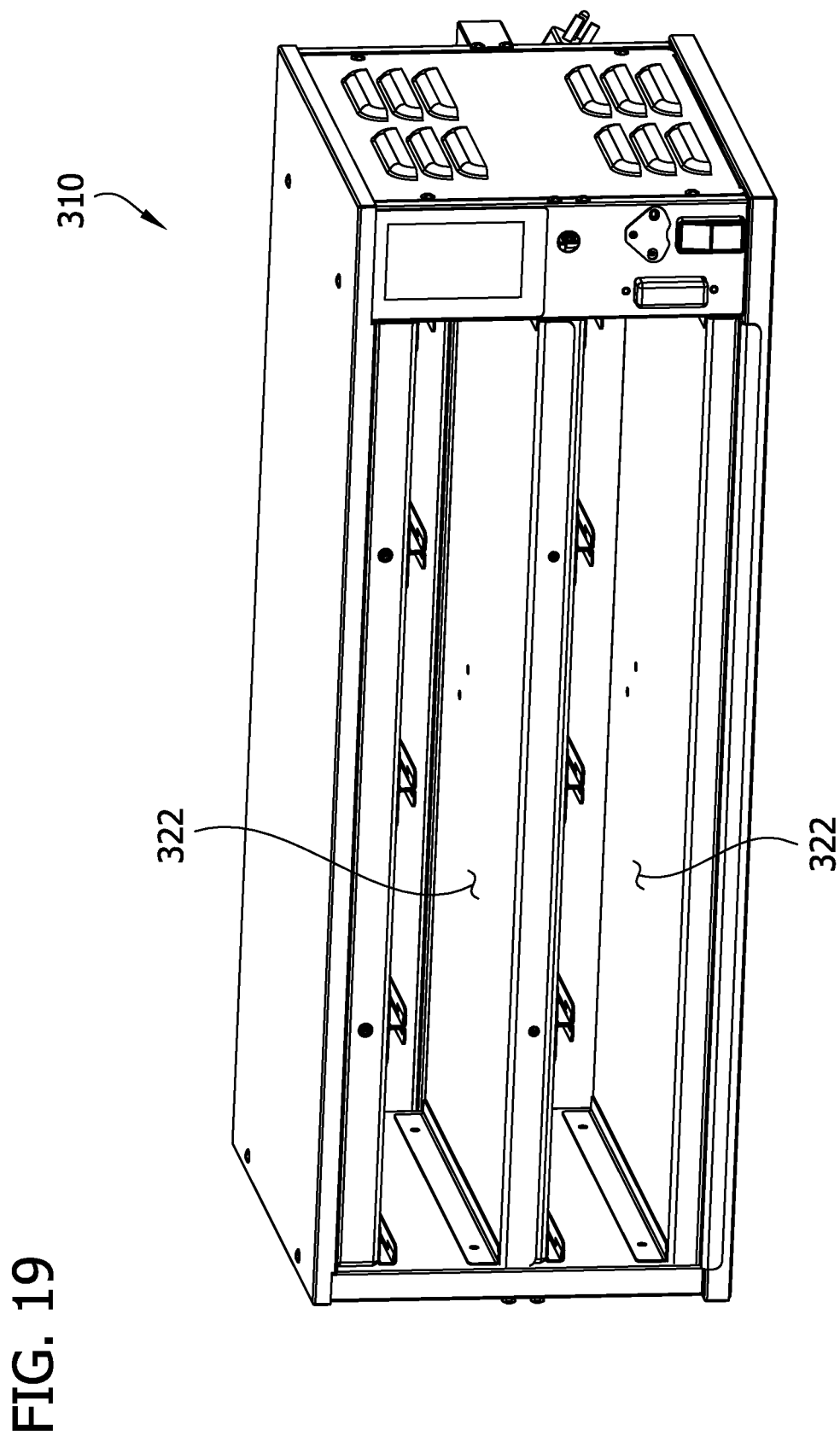
FIG. 19 is a perspective of a pan storage apparatus according to another embodiment of the present disclosure.
Figure 20:
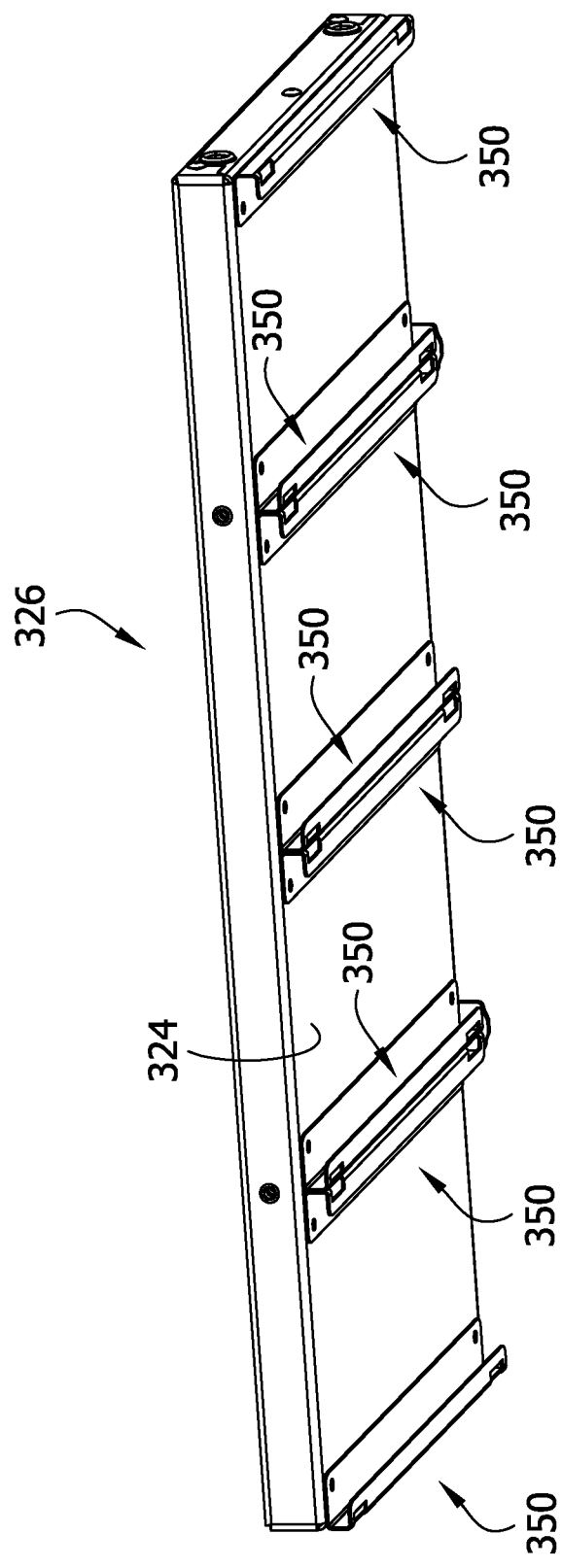
FIG. 20 is an upwardly looking perspective of an upper wall assembly of the pan storage apparatus of FIG. 19.
Figure 21:
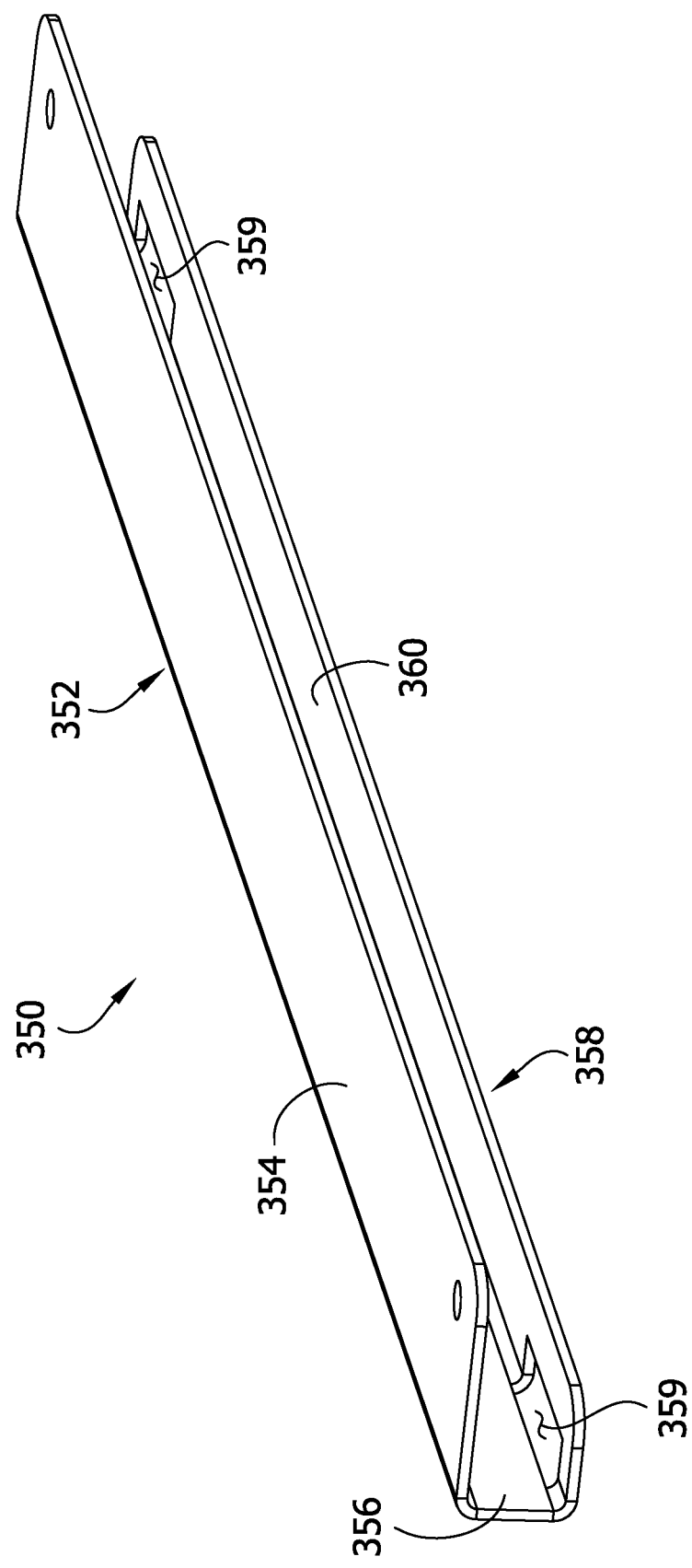
FIG. 21 is a perspective of a cover support of the pan storage apparatus of FIG. 19.
Figure 22:
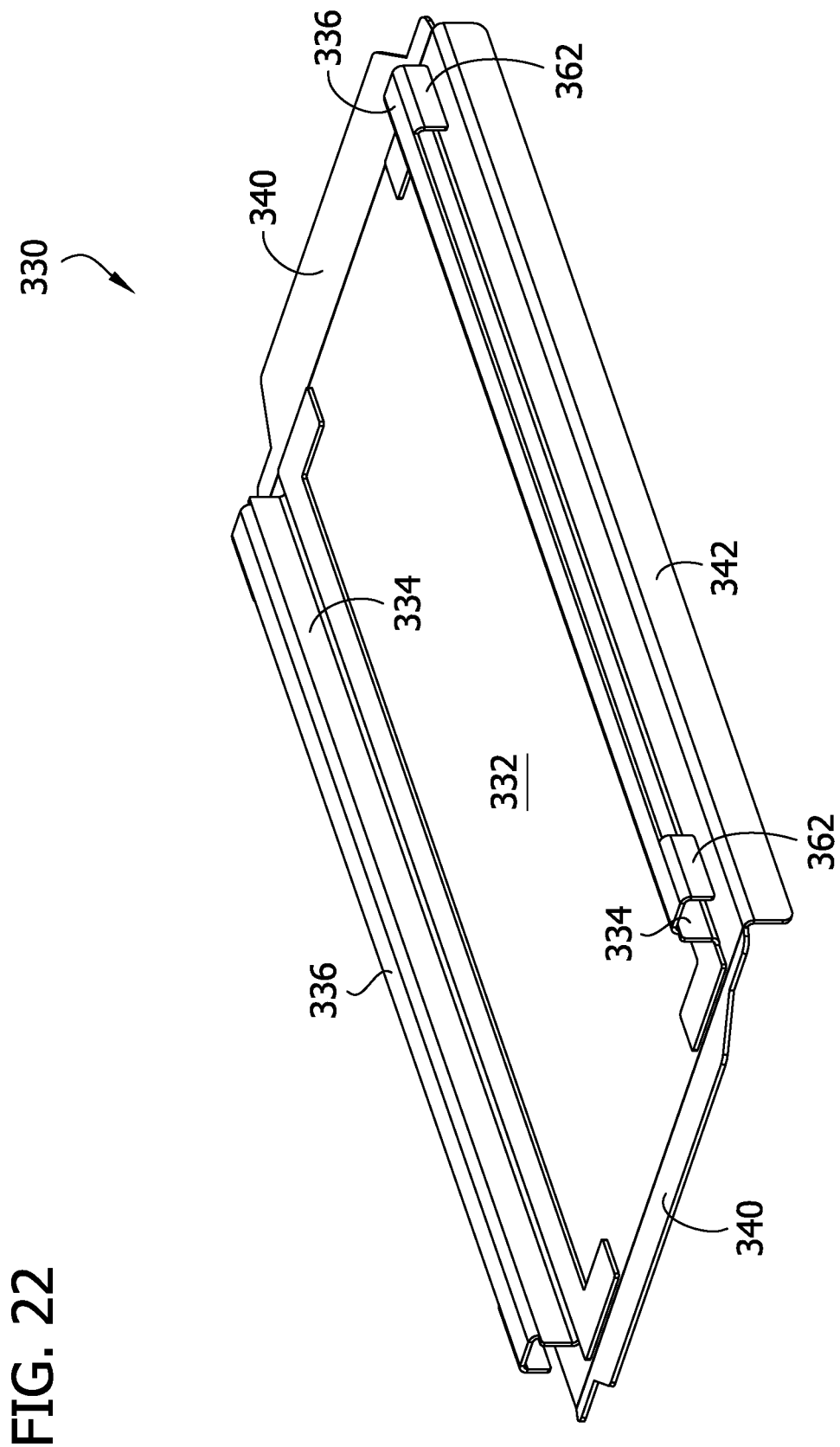
FIG. 22 is a perspective of a cover of the pan storage apparatus of FIG. 19.
Figure 23:
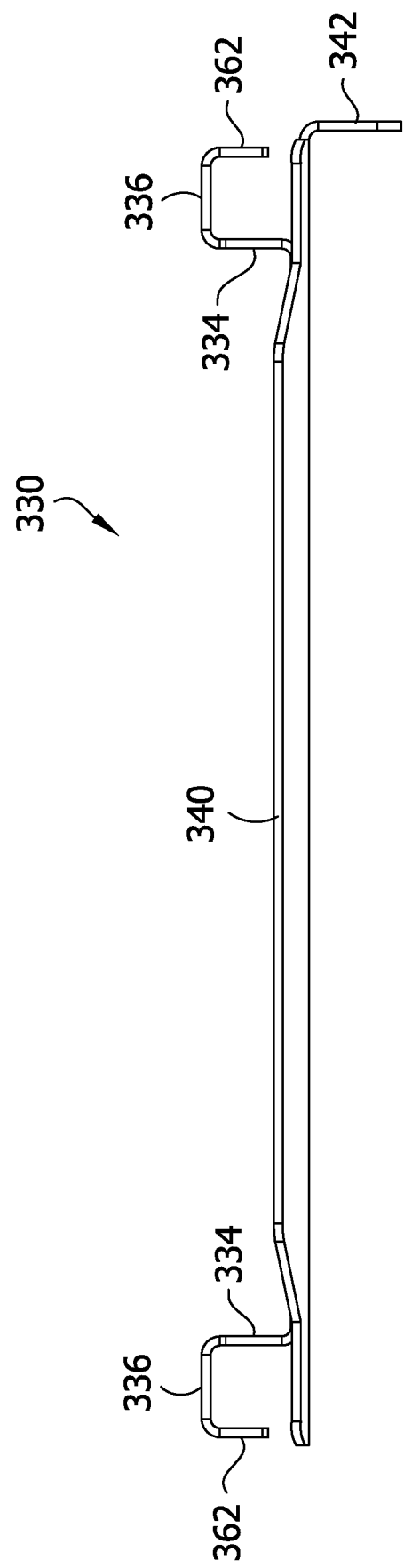
FIG. 23 is a front view of the cover of FIG. 22.

Referring to FIG. 18, another embodiment of a cover according to the present disclosure for a pan storage apparatus, as described herein, is generally indicated by the reference number 230. Cover 230 has substantially the same construction as the covers 30 and 130 and, thus, for ease of comprehension, where similar or identical parts are used, similar reference numerals, plus 200 or 100, respectively, are employed. Accordingly, unless clearly stated or indicated otherwise, the above descriptions regarding covers 30, 130 also apply to cover 230.

In this embodiment, the cover 230 includes a vent opening 233 to provide for venting from the open top of the pan 12. The vent opening 233 is defined by the pan covering portion 232. In the illustrated embodiment, the cover 230 includes a single vent opening 233 but other configurations are within the scope of the present disclosure. For example, the cover could include multiple vent openings in the form of perforations or holes and in a variety of different patterns and arrangements. In the illustrated embodiment, the cover 230 includes vent flanges 235 extending upward from the edges of the vent opening 233.

Referring to FIGS. 19-24, another embodiment of a pan storage apparatus according to the present disclosure is generally indicated by the reference number 310. The pan storage apparatus 310 includes covers 330 for covering pans 12. The pan storage apparatus 310 and the covers 330 of FIGS. 19-24 are generally analogous to the pan storage apparatus 10 and the covers 30, respectively, of FIGS. 1-14. Thus, for ease of comprehension, where similar, analogous, or identical parts are used, similar reference numerals, plus 200, are employed. Accordingly, unless clearly stated or indicated otherwise, the above descriptions regarding the pan storage apparatus 10 and the covers 30 of FIGS. 1-14 also apply to the pan storage apparatus 310 and the covers 330 of FIGS. 19-24.

In this embodiment, the configuration of the cover supports 350 is different from the cover supports 50 of FIGS. 1-14. Accordingly, the covers 330 of FIGS. 19-24 have a different configuration from the covers 30 of FIGS. 1-14 to correspond to the cover supports 330 of FIGS. 19-24.

The cover support 350 includes a rail 352 mounted to the upper wall 324. The rail 352 includes a front end adjacent to the front opening and a rear end adjacent to the rear opening. The rail 352 includes a mounting flange 354 and a side flange 356 extending generally downward form the mounting flange. The cover support 350 includes a holder 358 configured to support and retain the cover 330 in the pan storage space 322. The holder 358 generally extends from the front end to the rear end of the rail 352.

The holder 358 is configured to retain the cover 330 in the pan storage space 322 when the pan moves in (e.g., into or out of) the pan storage space. This holder 358 is also configured to support the cover 330 in the pan storage space 322. In the illustrated embodiment, the holder 358 comprises a support flange 360 extending generally horizontally from a lower edge margin of the side flange 356. The support flange 360 is generally planar. The support flange 360 and the mounting flange 354 generally extend in the same direction from the side flange 356. Thus, the cover support 350 has a generally U-shape defining a space or channel that receives a portion of the cover 330, as explained in more detail below. The support flange 360 defines (e.g., includes) a cover support surface (e.g., the upper surface of the support flange) of the cover support 350 configured to engage and support the cover 330 when the cover is in the pan storage space 322. The cover support surface is generally horizontal and generally extends the entire length of the rail 352. This arrangement makes it easier to install or connect the cover 330 to the cover support 350 because the cover (e.g., retainer flanges 362 described below) can ride along the support surface as the cover is being installed. The holder 358 (e.g., the support flange 360) defines at least one opening 359 (e.g., slot). In the illustrated embodiment, the holder 358 defines two slots 359, one generally adjacent the front of the rail 352 and the other generally adjacent the rear of the rail. As explained in more detail below, the slots 359 are used to help retain the cover 330 in the pan storage space 322 when pans are inserted into and removed from the space.

The cover 330 is configured to extend through the holder 358 and retain the cover in the pan storage space 322 when the pan moves in (e.g., into or out of) the pan storage space. The cover 330 includes left and right (e.g., first and second) side flange 334 extending generally upward from the respective left and right side edge margins of the pan covering portion 332. The cover 330 includes left and right (e.g., first and second) upper flanges 336 extending outward (e.g., away from one another) from the upper edge margins of the left and right side flange 334. The cover 330 also includes at least one retainer flange 362 (broadly, "retainer") extending generally downward from a side edge margin of one of the upper flanges 336. For reasons previously discussed, the retainer 362 may be considered a first or primary retainer. The retainer flange 362 is configured to extend through the cover support 350, specifically the holder 358 (e.g., the opening 359), when the cover 330 is supported by the cover support. The retainer flange 362 defines (e.g., includes) at least one retainer surface configured to engage the holder 358 (e.g., the edges of the opening 359) to retain the cover 330 in the pan storage space 322. In the illustrated embodiment, the retainer flange 362 includes a front retainer surface and a rear retainer surface. The front retainer surface is the front edge of the retainer flange 362 and the rear retainer surface is the rear edge of the retainer flange. The front retainer surface faces forward and generally inhibits the cover 330 from moving forward. The rear retainer surface faces rearward and generally inhibits the cover from moving rearward. The retainer surfaces are generally vertical (e.g., lie in a vertical plane). In the illustrated embodiment, the upper flange 336 in combination with the side flange 334 and the retainer flange 362 has a generally hook shape (e.g., J-hook shape). In the illustrated embodiment, the cover 330 includes four retainer flanges 362, two attached to each upper flange 336—one at the front end of each upper flange and one at the rear end of each upper flange.

To position the cover 330 in the pan storage space 22, the cover is moved into the pan storage space 322 through generally the upper portion of the front or rear opening and arranged with respect to the two cover supports 350 that will support the cover. In particular, the cover 330 is positioned so that the upper flanges 336 are disposed above the holders 358 and so that both cover supports 350 are generally positioned outward of the side flange 334. The cover 330 can then be moved forward or rearward within the pan storage space 322 (with the retainer flanges 362 riding along the support surfaces of the holders 358) until the retainer flanges 362 are aligned with the openings 359. By riding along the support surface, the end farthest from the operator installing the cover 330 does not need to be lifted in order for the corresponding retainer flanges 362 at that end of the cover to be aligned with the openings 359. When aligned, the cover 330 is lowered until the cover rests on the cover support surfaces of the cover supports 350 (e.g., holders 358). This can be referred to as a retained position of the cover 330. As the cover 330 is lowered, the retainer flanges 362 extend into and through the openings 359.

To remove the cover 330 in the pan storage space 322 (e.g., for cleaning, rearrangement or replacement), the cover 330 is lifted or raised until the retaining flanges 362 no longer extend into or through the openings 359 (e.g., the retainers are out of horizontal registration with and above the edges of the openings of the holders 358). This can be referred to as a non-retained position of the cover 330. When the cover 330 is clear of the holders 358, the cover is moved out of the pan storage space 322 through the front or rear opening (e.g., upper portion thereof). The cover 330 can be moved in either a generally forward or rearward direction.

Figure 24:
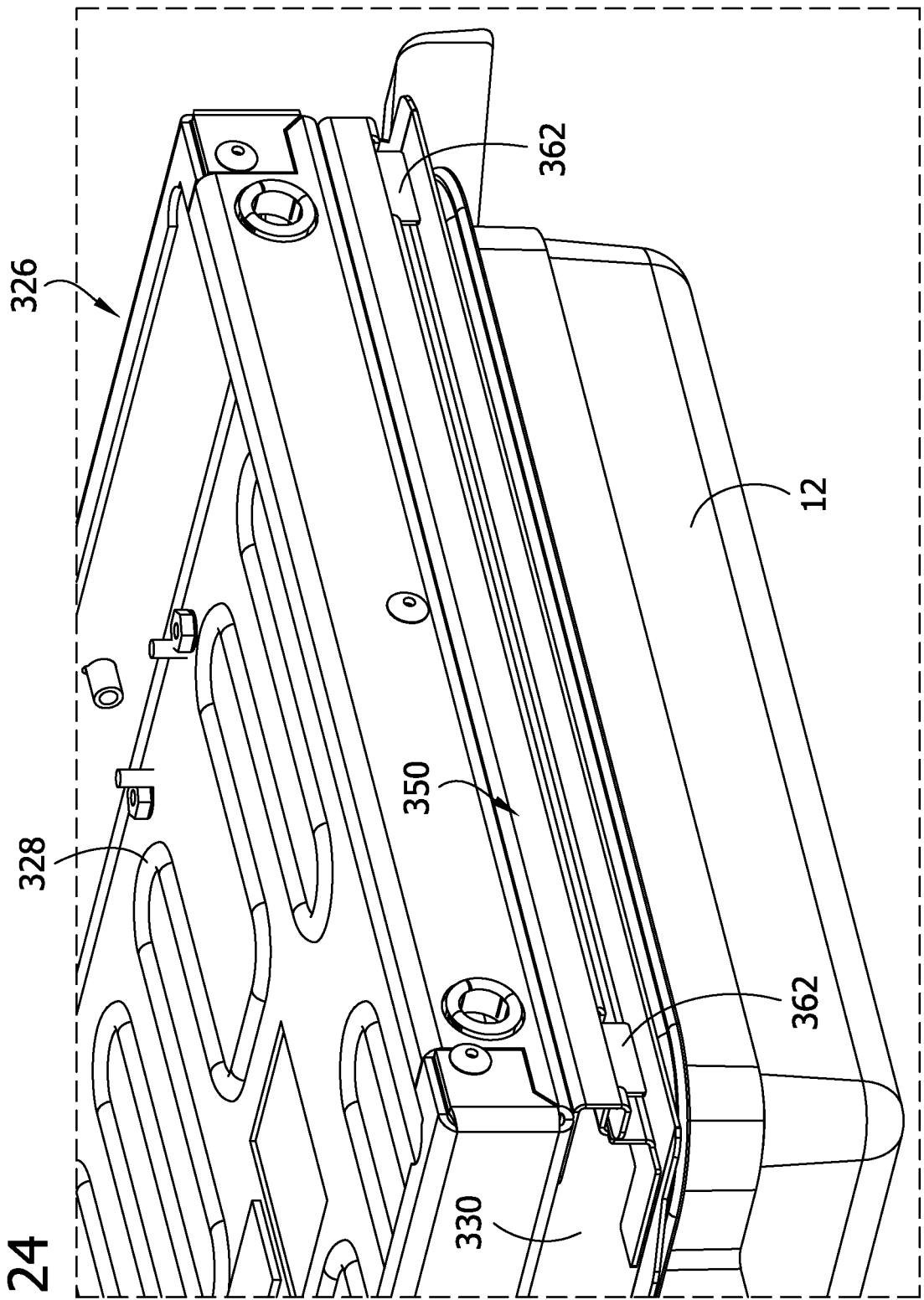
FIG. 24 is an enlarged, perspective of a side of an upper wall assembly of the pan storage apparatus of FIG. 19 supporting the cover of FIG. 22, with a pan covered by the cover, other components of the pan storage apparatus being hidden from view to show interior details.

When the cover 330 is in the pan storage space 322, the retainers 362 retain the cover in the pan storage space for preventing inadvertent removal of the cover from the pan storage space. In particular, the holders 358 inhibit the cover 330 from moving in either the forward or rearward direction with the pan as the pan is inserted or removed from the pan storage space 322. As a pan is inserted or removed from the pan storage space 322, the pan engages and tends to drag the cover 330 in the same direction the pan is moving. To inhibit the cover 330 from being dragged with the pan, the retainer flange 362 (e.g., retainer surface) engages the holder 358, thereby preventing the cover from moving with the pan. For example, if the pan is moving in a forward direction, the forward retainer surfaces of the retainer flanges 362 engage the edges of the openings 359 (broadly, holder retainer surfaces) to inhibit the cover 330 from moving in the forward direction. Similarly, if the pan is moving in a rearward direction, the rear retainer surfaces of the retaining flanges 362 engage the edges of the openings 359 to inhibit the cover 330 from moving in the rearward direction. Accordingly, the holders 358 and the cover 330 are arranged relative to one another such that the support flange 360 and the cover engage one another to retain the cover in the pan storage space 322 when the pan moves in the pan storage space As mentioned above, the pan is stored in the pan storage space 322 by sliding it along the pan support surface. As the pan is received in the pan storage space 322, the pan lifts the cover 330 upward such that the cover becomes supported by and rests on the rim of the pan, thereby covering the open top of the pan. In this position, the cover 330 is spaced above and out of engagement with the cover support surfaces of the cover supports 350. The cover support surfaces of the holders 358 are located with respect to the pan support surface so that the height of the pan is greater than the vertical distance between the cover support surfaces and the pan support surface so the pan lifts the cover 330 off the cover support surfaces. Desirably, when the pan reaches its stowed position in the pan storage space 322, the cover 330 covers the open top of the pan and substantially seals around the rim. In the illustrated embodiment, the cover 330 is biased against the rim by gravity only, but biasing devices such as springs, clamps, etc. may be used without departing from the scope of the present disclosure. As shown in FIG. 24, when the pan supports the cover 330 off the cover support surfaces, the retainer surfaces of the retainer flanges 362 are still in horizontal registration with the edges of the opening 359 (e.g., the holders 358) (i.e., the cover is still in the retained position) for retaining the cover in the pan storage space 322.

In view of the above, generally, the arrangement of the retainer flanges and the openings are reversed between the embodiment of FIGS. 1-14 and the embodiment of FIGS. 19-24. Accordingly, broadly, it may be considered that one of the holder or the cover includes a retainer and the other of the holder or the cover includes an opening through which the retainer extends. With the retainer configured to engage the other of the holder or the cover to retain the cover in the pan storage space when the pan moves in the pan storage space. In particular, the retainer is configured to engage an edge of the other of the holder or the cover that defines the opening to retain the cover in the pan storage space when the pane moves in the pan storage space.

It is apparent that the elements, features, and/or teachings set forth in each embodiment disclosed herein are not limited to the specific embodiment(s) the elements, features, and/or teachings are described in. Accordingly, it is understood that the elements, features, and/or teachings described in one embodiment may be applied to one or more of the other embodiments disclosed herein, even if said elements, features and/or teachings where not described as being a part of said one or more other embodiments. For example, it is understood the cover 330 of FIGS. 19-23 can be arranged and rearranged like the cover 30 of FIGS. 1-14. In another example, it is understood the cover of FIGS. 19-23 can have an opening like the openings 233 of the cover 230 of FIG. 18 and/or have a height like the height of the cover 130 of FIGS. 15-17.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above constructions, products, and methods without departing from the scope of the claims, it is intended that all matter contained in the above description and shown in the accompanying drawings shall be interpreted as illustrative and not in a limiting sense.

OTHER STATEMENTS OF INVENTION

The following are statements of invention described in the present disclosure. Although some of the following statements are not currently presented as claims, the statements are believed to be patentable and may subsequently be presented as claims. Associated apparatuses corresponding to method statements, are also believed to be patentable and may subsequently be presented as claims. Associated methods corresponding to apparatus statements, are also believed to be patentable and may subsequently be presented as claims. It is understood that the following statements may refer to and be supported by one, more than one, or all of the embodiments described above.

A1. A method of retaining a cover for a pan with an open top, the method comprising: at least partially covering the open top of the pan disposed in a pan storage space with the cover; at least partially removing the pan from the pan storage space; and as the pan is at least partially removed from the pan storage space, retaining the cover in the pan storage space with at least one cover support disposed in the pan storage space, the at least one cover support supporting and retaining the cover in the pan storage space.

A2. The method of statement A1, wherein the at least one retainer support includes a first cover support and a second cover support, the first and second cover supports supporting opposite sides of the cover.

A3. The method of statement A1, wherein the at least one cover support includes a support surface engaging and supporting the cover and wherein the retainer includes a retainer surface engaging and retaining the cover in the pan storage space.

A4. The method of statement A3, wherein the support surface is generally horizontal and the retainer surface is generally vertical.

A5. The method of statement A4, wherein the at least one cover support includes a support flange including the support surface and the retainer includes a retainer flange including the retainer surface, the retainer flange extending from the support flange.

A6. The method of statement A5, wherein the retainer flange extends through the cover.

B1. A method of organizing a pan storage apparatus for storing pans of different sizes, each pan having an open top, the method comprising: supporting a first cover in a pan receiving space of the pan storage apparatus with a first cover support group of a plurality of cover supports, the first cover having a first cover size and shaped to cover a first pan of a first pan size; and supporting a second cover in the pan receiving space with a second cover support group of the plurality of cover supports, the second cover having a second cover size and shape to cover a second pan of a second pan size different than the first pan size.

B2. The method of statement B1, wherein supporting the second cover includes removing the first cover from the first cover support group and using at least one of the cover supports of the first cover support group as part of the second cover support group to support the second cover.

B3. The method of statement B1, further comprising supporting a third cover in the pan receiving space with a third cover support group of the plurality of cover supports, the third cover sized and shaped to cover a third pan of a third size different than the first and second sizes, the third cover having a different size than the first and second covers.

B4. The method of statement B1, further comprising rearranging the first and second covers in the pan storage space.

B5. The method of statement B4, wherein rearranging includes changing which cover supports of the plurality of cover supports support the respective first and second covers.

B6. The method of statement B4, wherein rearranging includes removing one of the first and second covers from the cover supports, turning the cover support to reorient the cover support, and reinstalling said one of the first and second covers on the cover supports as reoriented.

C1. A method of organizing a pan storage apparatus for storing pans of different sizes, each pan having an open top, the method comprising: positioning first and second covers in a first orientation in a pan receiving space of the pan storage apparatus, the first and second covers including respective first and second dividers for dividing the pan receiving space to receive a first pan and a second pan; and rearranging at least one of the first and second covers in the pan receiving space for dividing the pan receiving space to receive a third pan of a size different than at least one of the first and second pans.

C2. The method of statement C1, wherein rearranging includes rearranging both of the first and second covers in the second orientation.

C3. The method of statement C1, wherein rearranging includes moving at least one of the first and second covers to a second orientation different than the first orientation.

C4. The method of statement C3, wherein moving to the second orientation includes rotating the at least one of the first and second pans approximately 180 degrees about a vertical axis.

D1. A method of keeping a cover in a pan storage space of a pan holding apparatus, the method comprising: retaining the cover in the pan storage space with a primary retainer when a pan with an open top moves in the pan storage space; and retaining the cover in the pan storage space with a secondary retainer when the pan moves in the pan storage space and the primary retainer fails to retain the cover in the pan storage space.

D2. The method of statement D1, wherein the primary retainer is disposed in the pan storage space and the secondary retainer is disposed outside the pan storage space.

D3. The method of statement D1, wherein the retaining the cover in the pan storage space with the secondary retainer includes positioning the cover to reengage the primary retainer.

D4. The method of statement D1, wherein the primary retainer extends through the cover and the secondary retainer blocks a portion of a front pan receiving opening of the pan storage space.

What is claimed is:

1. An apparatus for storing a pan with an open top, the apparatus comprising:
  a housing having a pan storage space with a front pan receiving opening configured to permit the pan to be inserted into and removed from the pan storage space;
  a pan support surface configured to support the pan when the pan is in the pan storage space;
  a cover receivable in the pan storage space and configured to at least partially cover the open top of the pan when the pan is in the pan storage space; and
  at least one cover support coupled to the housing, the at least one cover support having a holder with a support surface configured to support the cover in the pan storage space, wherein the holder and the cover are arrangeable relative to one another such that the holder and the cover engage one another to retain the cover in the pan storage space when the pan moves in the pan storage space;
  wherein one of the holder or the cover includes a retainer and the other of the holder or the cover includes an opening through which the retainer extends, the retainer configured to engage the other of the holder or the cover to retain the cover in the pan storage space when the pan moves in the pan storage space.

2. The apparatus of claim 1, wherein the at least one cover support includes a first cover support and a second cover support, the first and second cover supports configured to support opposite sides of the cover.

3. The apparatus of claim 1, wherein the retainer is configured to engage an edge of the other of the holder or the cover that defines the opening to retain the cover in the pan storage space when the pan moves in the pan storage space.

4. The apparatus of claim 1, wherein the holder includes the opening and the cover includes the retainer.

5. The apparatus of claim 1, wherein the holder comprises a support flange, the support flange defining the support surface, wherein the holder and the cover are configured such that the support flange and the cover engage one another to retain the cover in the pan storage space when the pan moves in the pan storage space.

6. The apparatus of claim 1, wherein the holder includes the retainer and the cover includes the opening.

7. The apparatus of claim 1, wherein the retainer is configured to engage the other of the holder or the cover to retain the cover in the pan storage space when the pan moves into the pan storage space and out of the pan storage space.

8. The apparatus of claim 1, wherein the retainer is configured to prevent the cover from moving rearwardly in the pan storage space with the pan when the pan is moved rearwardly into the pan storage space through the front pan receiving opening and is configured to prevent the cover from moving forwardly in the pan storage space with the pan when the pan is moved forwardly out of the pan storage space through the front pan receiving opening.

9. The apparatus of claim 1, wherein the holder comprises a hook.

10. The apparatus of claim 1, wherein the at least one cover support is disposed in the pan storage space.

11. The apparatus of claim 1, wherein the retainer includes a first edge configured to engage the cover to prevent the cover from moving in the pan storage space in a first direction and a second edge configured to engage the cover to prevent the cover from moving in the pan storage space in a second direction.

12. The apparatus of claim 11, wherein the first direction is opposite the second direction.

13. The apparatus of claim 1, further comprising the pan.

14. The apparatus of claim 1, wherein the holder is a first holder and the support surface is a first support surface, the at least one cover support having a second holder with a second support surface configured to support the cover in the pan storage space.

15. The apparatus of claim 14, wherein the first holder is adjacent the front pan receiving opening and the second holder is adjacent a rear of the pan storage space.

16. The apparatus of claim 14, wherein the retainer is a first retainer and the opening is a first opening, wherein the second holder and the cover are arrangeable relative to one another such that the second holder and the cover engage one another to retain the cover in the pan storage space when the pan moves in the pan storage space, wherein one of the second holder or the cover includes a second retainer and the other of the second holder or the cover includes a second opening through which the second retainer extends, the second retainer configured to engage the other of the second holder or the cover to retain the cover in the pan storage space when the pan moves in the pan storage space.

17. An apparatus for storing pans of different sizes, each pan having an open top, the apparatus comprising:
 a housing having a pan storage space with a front pan receiving opening configured to permit the pans to be inserted into and removed from the pan storage space;
 a pan support surface configured to support the pans when the pans are in the pan storage space;
 a first cover having a first cover size and shape to cover a first pan of a first pan size;
 a second cover having a second cover size and shape to cover a second pan of a second pan size different than the first pan size, the second cover size being different than the first cover size; and
 a plurality of cover supports coupled to the housing and configured to support the first and second covers in the pan storage space, the plurality of cover supports including a first cover support group configured to support the first cover and a second cover support group configured to support the second cover.

18. The apparatus of claim 17, wherein the first cover support group and the second cover support group include at least one of the same cover supports.

19. The apparatus of claim 17, further comprising a third cover having a size and shape to cover a third pan of a third size different than the first and second sizes, the third cover having a different size than the first and second covers, wherein the plurality of cover supports includes a third cover support group configured to support the third cover.

20. The apparatus of claim 19, wherein the first cover is sized and shaped to cover a ⅓ size pan, the second cover is sized and shaped to cover a ⅔ size pan, and the third cover is sized and shaped to cover a full size pan.

21. The apparatus of claim 19, wherein the pan storage space is sized large enough to permit at least two of the first, second, or third covers to be supported in the pan storage space at the same time.

22. The apparatus of claim 17, wherein the cover supports are fixed with respect to the housing.

23. The apparatus of claim 19, wherein the first cover support group and the third cover support group include at least one of the same cover supports.

24. The apparatus of claim 19, wherein the second cover support group and the third cover support group include at least one of the same cover supports.

25. The apparatus of claim 17, wherein the cover supports are coupled to an upper wall of the housing, the upper wall of the housing bounding a top of the pan storage space.

26. The apparatus of claim 17, wherein the cover supports are disposed in the pan storage space.

27. The apparatus of claim 17, wherein each cover support has a holder with a support surface configured to support the first and/or second cover in the pan storage space, wherein the holders of the cover supports of the first cover support group and the first cover are arrangeable relative to one another such that the holders of the cover supports of the first cover support group and the first cover engage one another to retain the first cover in the pan storage space when the first pan moves in the pan storage space, and wherein the holders of the cover supports of the second cover support group and the second cover are arrangeable relative to one another such that the holders of the cover supports of the second cover support group and the second cover engage one another to retain the second cover in the pan storage space when the second pan moves in the pan storage space.

28. The apparatus of claim 17, further comprising the first pan and the second pan.

\* \* \* \* \*